United States Patent
Qu et al.

(10) Patent No.: US 11,199,950 B2
(45) Date of Patent: Dec. 14, 2021

(54) MOVING IMAGE REPRODUCTION APPARATUS, CANDIDATE JUMP DESTINATION DISPLAY METHOD, AND COMPUTER PROGRAM

(71) Applicant: KONICA MINOLTA, INC., Tokyo (JP)

(72) Inventors: Zhenhuan Qu, Toyokawa (JP); Atsushi Tomita, Toyohashi (JP); Yoichi Kurumasa, Toyokawa (JP); Shoko Haba, Toyokawa (JP); Ryosuke Nishimura, Toyokawa (JP); Mie Kawabata, Toyokawa (JP); Kazuhiro Tomiyasu, Toyokawa (JP)

(73) Assignee: KONICA MINOLTA, INC., Tokyo (JP)

(*) Notice: Subject to any disclaimer, the term of this patent is extended or adjusted under 35 U.S.C. 154(b) by 118 days.

(21) Appl. No.: 15/808,207

(22) Filed: Nov. 9, 2017

(65) Prior Publication Data
US 2018/0136805 A1    May 17, 2018

(30) Foreign Application Priority Data

Nov. 14, 2016  (JP) .............................. JP2016-221801

(51) Int. Cl.
G06F 3/0484  (2013.01)
H04N 1/00    (2006.01)
H04N 1/32    (2006.01)

(52) U.S. Cl.
CPC ....... *G06F 3/0484* (2013.01); *H04N 1/00129* (2013.01); *H04N 1/00411* (2013.01);
(Continued)

(58) Field of Classification Search
CPC .......... G06F 17/24; G06F 17/25; G06T 11/60; A63F 2300/5553; A63F 2300/6623
(Continued)

(56) References Cited

U.S. PATENT DOCUMENTS

| 8,762,844 B2* | 6/2014 | Kim .................... H04N 21/4312 715/716 |
| 2008/0317431 A1* | 12/2008 | Mishima .................. H04N 5/85 386/278 |

(Continued)

FOREIGN PATENT DOCUMENTS

| JP | 2014164767 A | 9/2014 |
| JP | 2015116723 A | 6/2015 |

OTHER PUBLICATIONS

Japanese Office Action (and English language translation thereof) dated Jun. 30, 2020 issued in Japanese Application No. 2016-221801.

*Primary Examiner* — Kavita Stanley
*Assistant Examiner* — Jenq-Kang Chu
(74) *Attorney, Agent, or Firm* — Holtz, Holtz & Volek PC

(57) ABSTRACT

A moving image reproduction apparatus for reproducing a moving image for explaining a work including a plurality of steps, includes: a reproducer that reproduces the moving image; a progress display that displays an indicator indicating a progress of reproduction of the moving image and a position on the indicator where the moving image is being currently reproduced; and a candidate display that displays a candidate image corresponding to at least one jump destination included in the moving image when a predetermined operation is performed on the indicator.

12 Claims, 23 Drawing Sheets

(52) U.S. Cl.
CPC ..... *H04N 1/00506* (2013.01); *H04N 1/32122* (2013.01); *G06F 3/04842* (2013.01); *H04N 2201/0094* (2013.01); *H04N 2201/3267* (2013.01)

(58) Field of Classification Search
USPC ................................ 715/201, 202, 230, 255
See application file for complete search history.

(56) References Cited

U.S. PATENT DOCUMENTS

| | | | |
|---|---|---|---|
| 2009/0293020 A1* | 11/2009 | Nakai | H04N 1/00129 |
| | | | 715/838 |
| 2012/0195571 A1* | 8/2012 | Matsuda | H04N 5/772 |
| | | | 386/241 |
| 2014/0240233 A1 | 8/2014 | Jeong et al. | |
| 2017/0013140 A1* | 1/2017 | Tachibana | H04N 1/00013 |

* cited by examiner

| MAINTENANCE | CORRESPONDING ERROR | STEP 1 | STEP 2 | STEP 3 | STEP 4 | STEP 5 | STEP 6 |
|---|---|---|---|---|---|---|---|
| ELIMINATION OF PAPER JAM IN FIXING UNIT | PAPER JAM IN FIXING UNIT | SIDE DOOR SENSOR<br>BEFORE: SIDE DOOR CLOSED<br>AFTER: SIDE DOOR OPENED | LEVER SENSOR<br>BEFORE: LEVER RAISED<br>AFTER: LEVER LOWERED | CARRYING PATH SENSOR<br>BEFORE: SHEET PRESENT<br>AFTER: SHEET ABSENT | LEVER SENSOR<br>BEFORE: LEVER LOWERED<br>AFTER: LEVER RAISED | SIDE DOOR SENSOR<br>BEFORE: SIDE DOOR OPENED<br>AFTER: SIDE DOOR CLOSED | |
| ELIMINATION OF PAPER JAM IN HOLE PUNCHER | PAPER JAM IN HOLE PUNCHER | FRONT DOOR SENSOR<br>BEFORE: FRONT DOOR CLOSED<br>AFTER: FRONT DOOR OPENED | FIRST LEVER SENSOR<br>BEFORE: FIRST LEVER RAISED<br>AFTER: FIRST LEVER LOWERED<br>(SECOND CARRYING PATH SENSOR<br>BEFORE: SHEET PRESENT<br>AFTER: SHEET ABSENT)<br>FIRST LEVER SENSOR<br>BEFORE: FIRST LEVER LOWERED<br>AFTER: FIRST LEVER RAISED | SECOND LEVER SENSOR<br>BEFORE: SECOND LEVER RAISED<br>AFTER: SECOND LEVER LOWERED<br>ATTACHMENT/DETACHMENT SENSOR<br>BEFORE: MOUNTED<br>AFTER: REMOVED | SECOND CARRYING PATH SENSOR<br>BEFORE: SHEET PRESENT<br>AFTER: SHEET ABSENT | ATTACHMENT/DETACHMENT SENSOR<br>BEFORE: REMOVED<br>AFTER: MOUNTED<br>SECOND LEVER SENSOR<br>BEFORE: SECOND LEVER LOWERED<br>AFTER: SECOND LEVER RAISED | FRONT DOOR SENSOR<br>BEFORE: FRONT DOOR OPENED<br>AFTER: FRONT DOOR CLOSED |
| ... | ... | ... | ... | ... | ... | ... | ... |

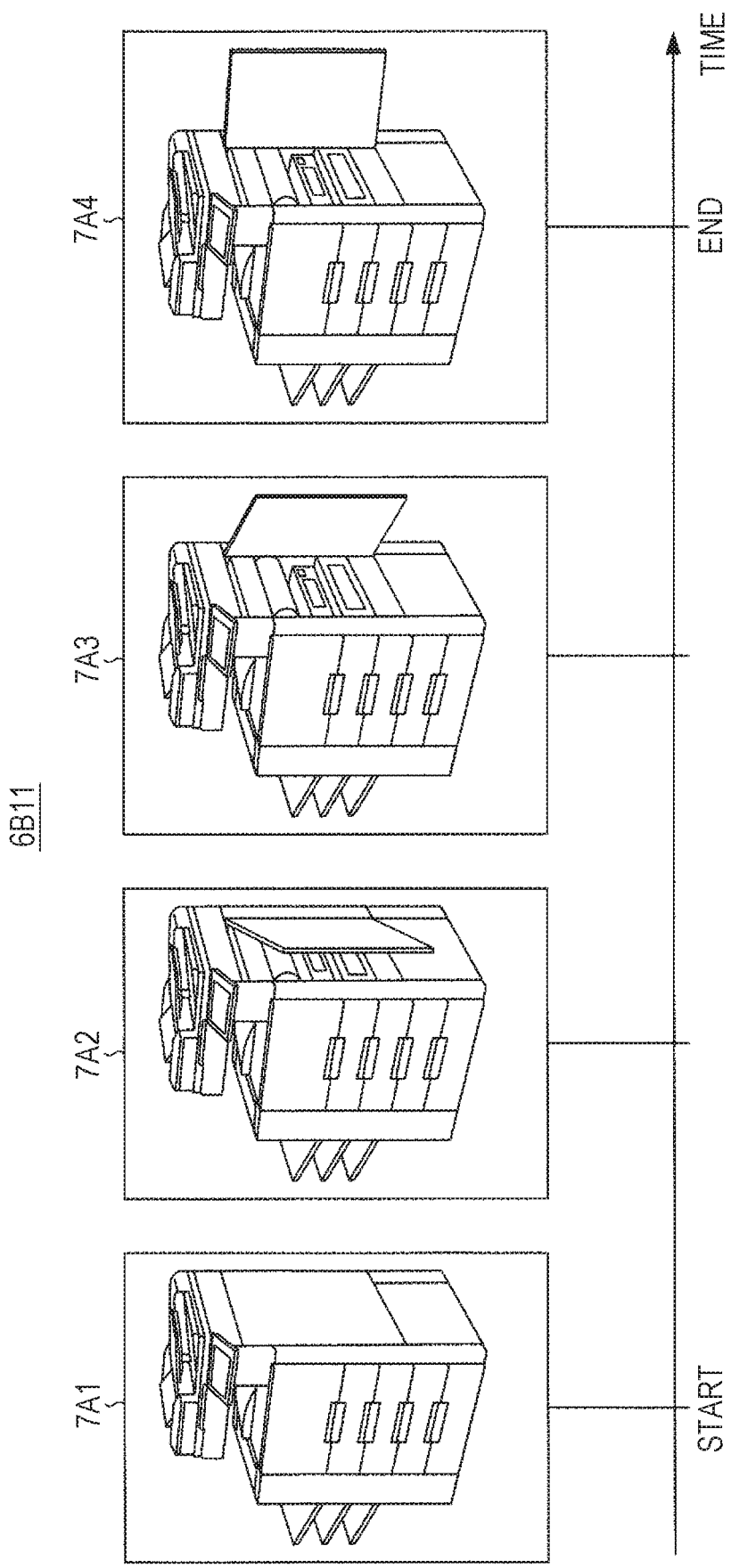

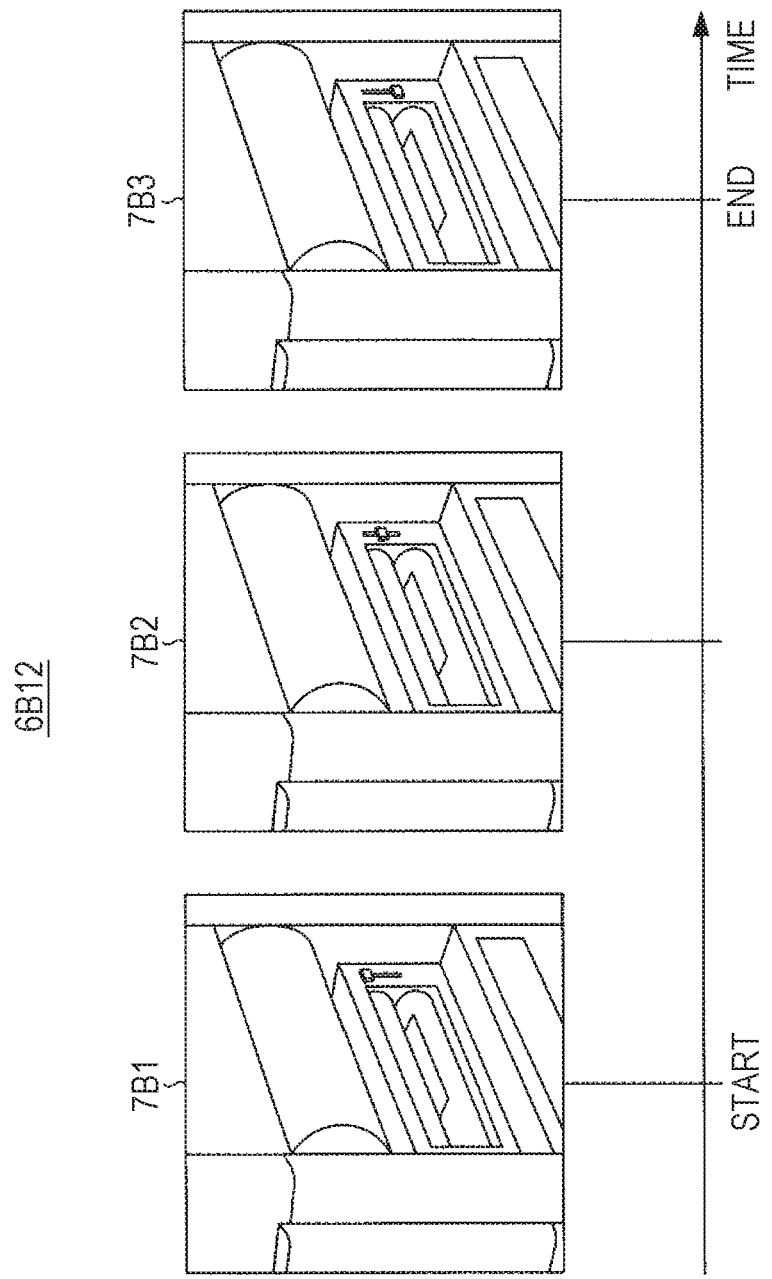

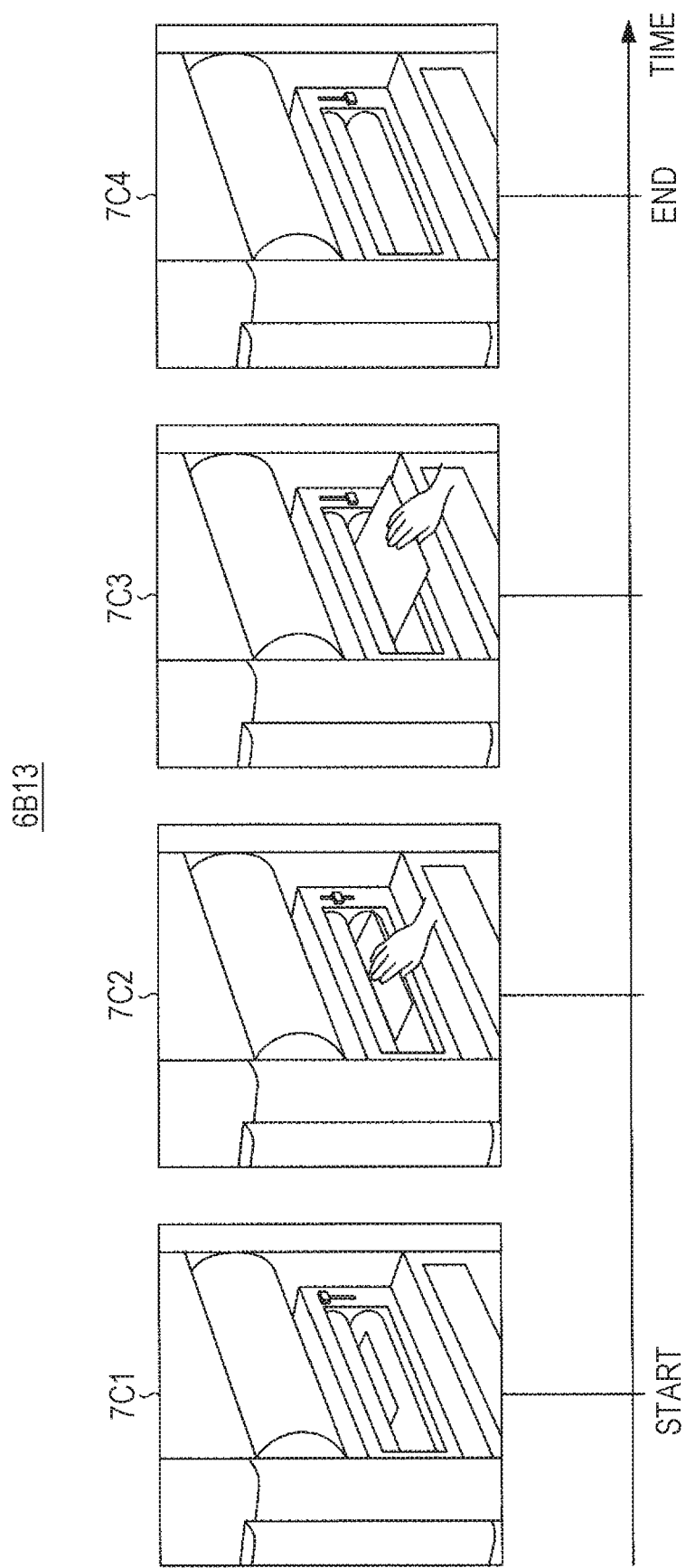

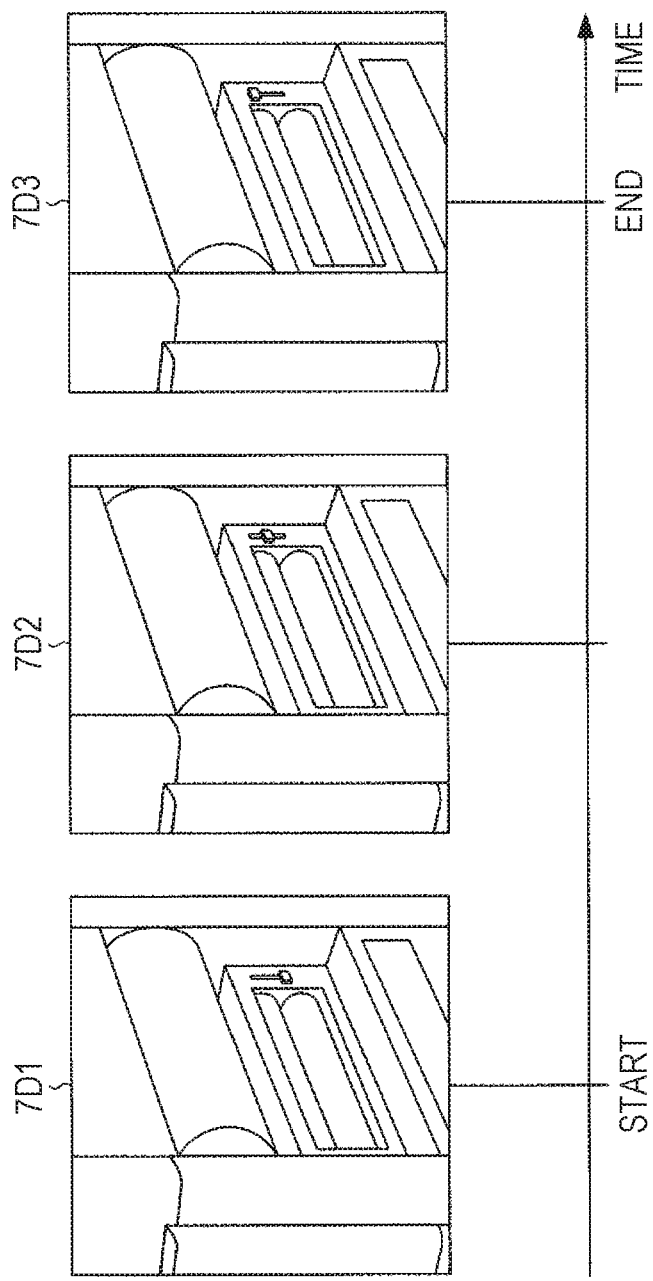

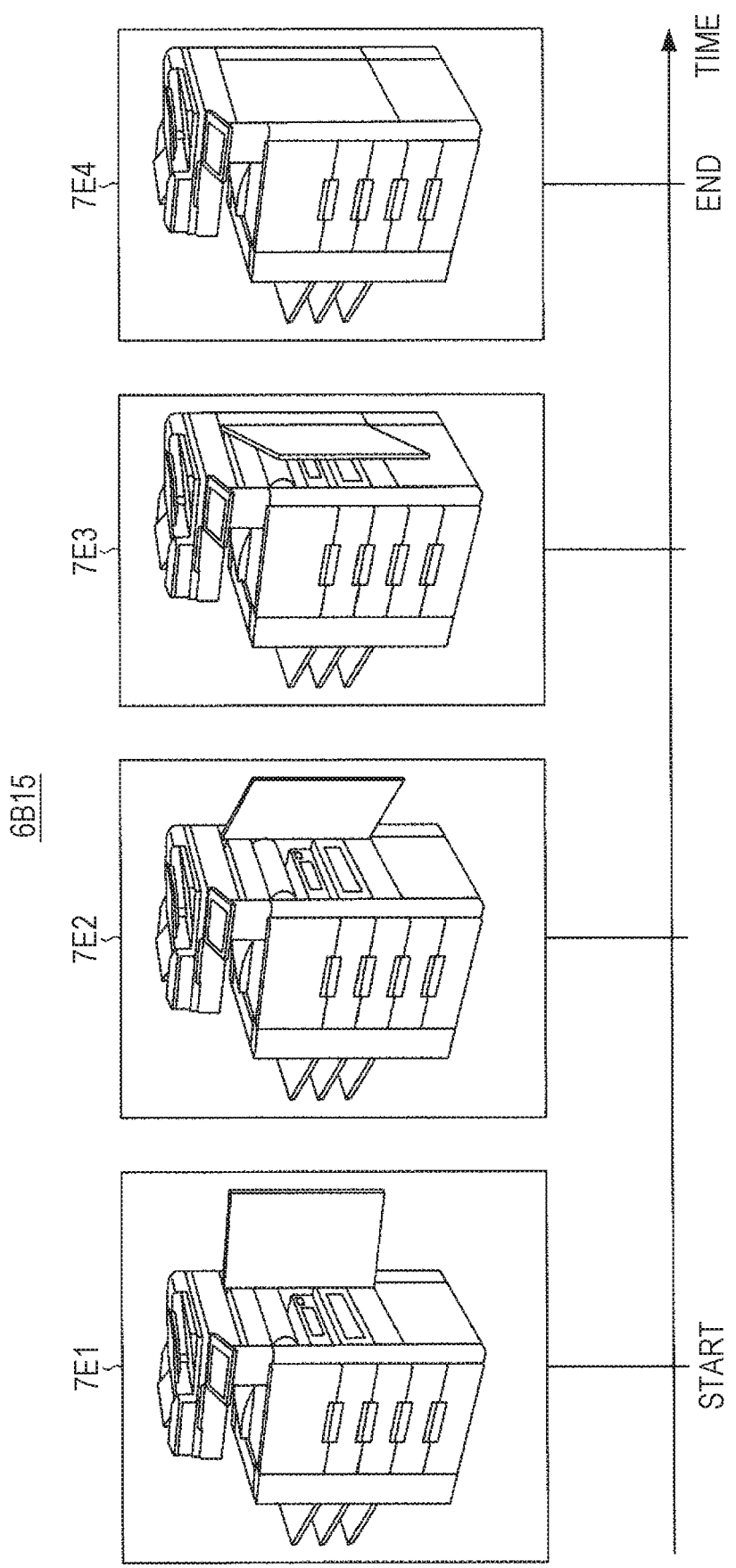

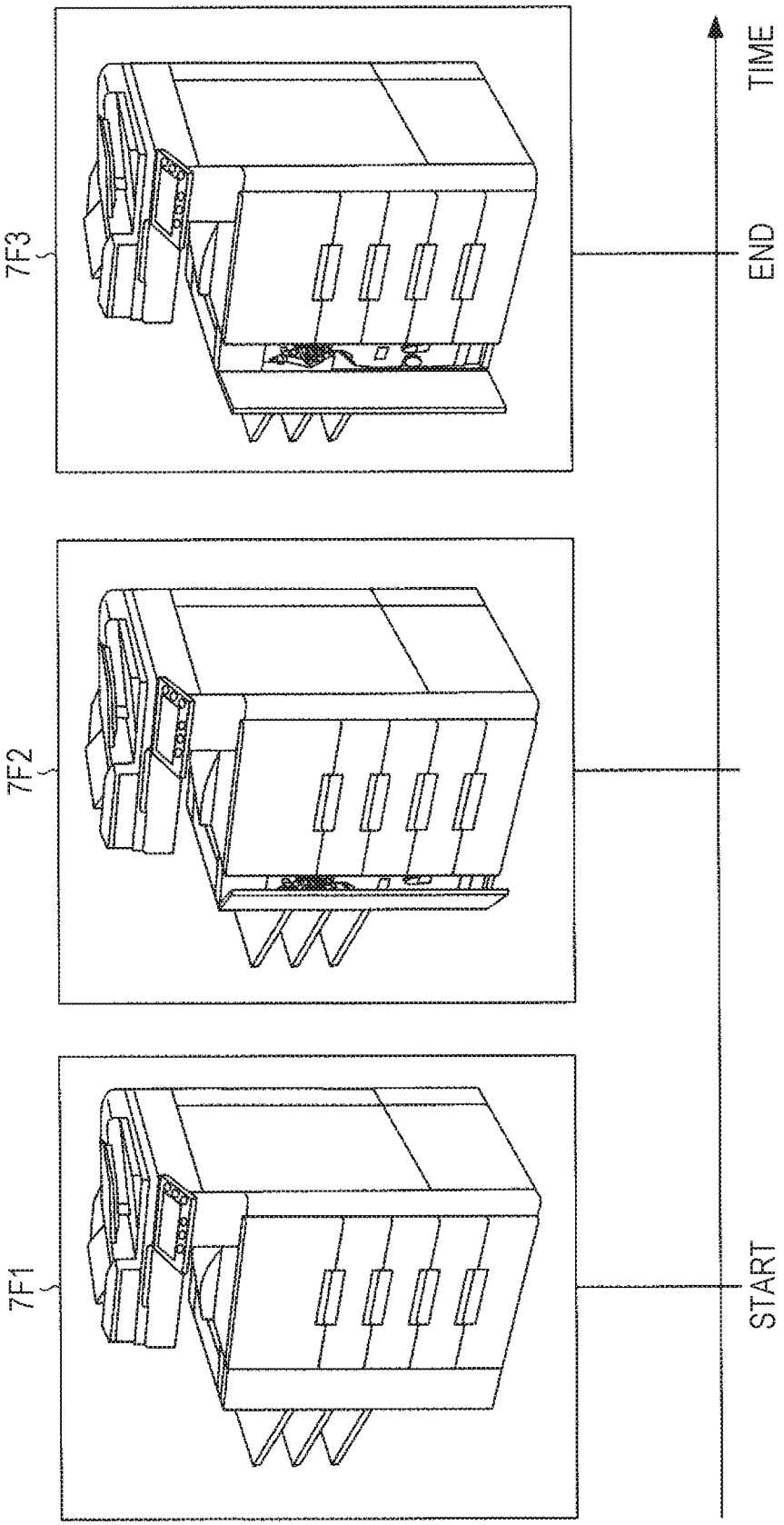

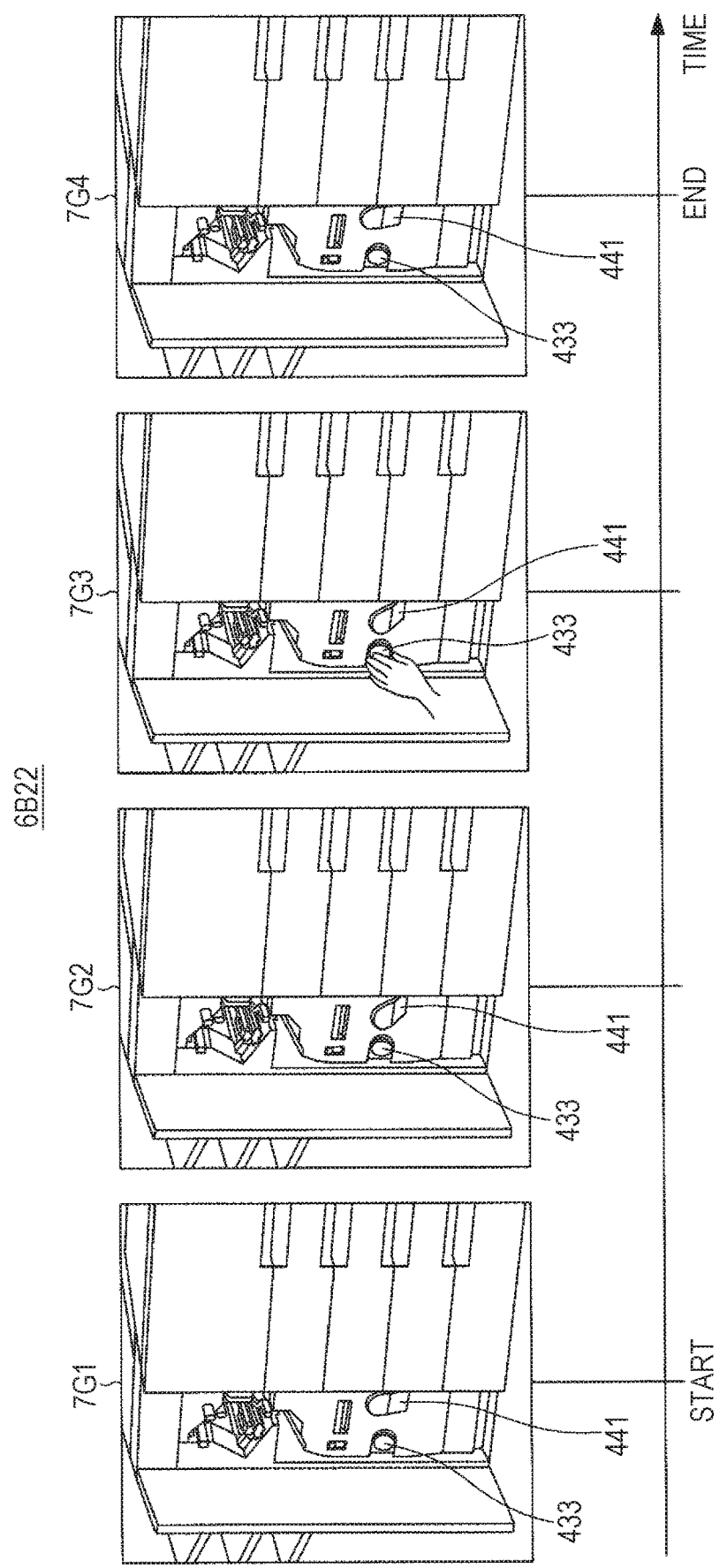

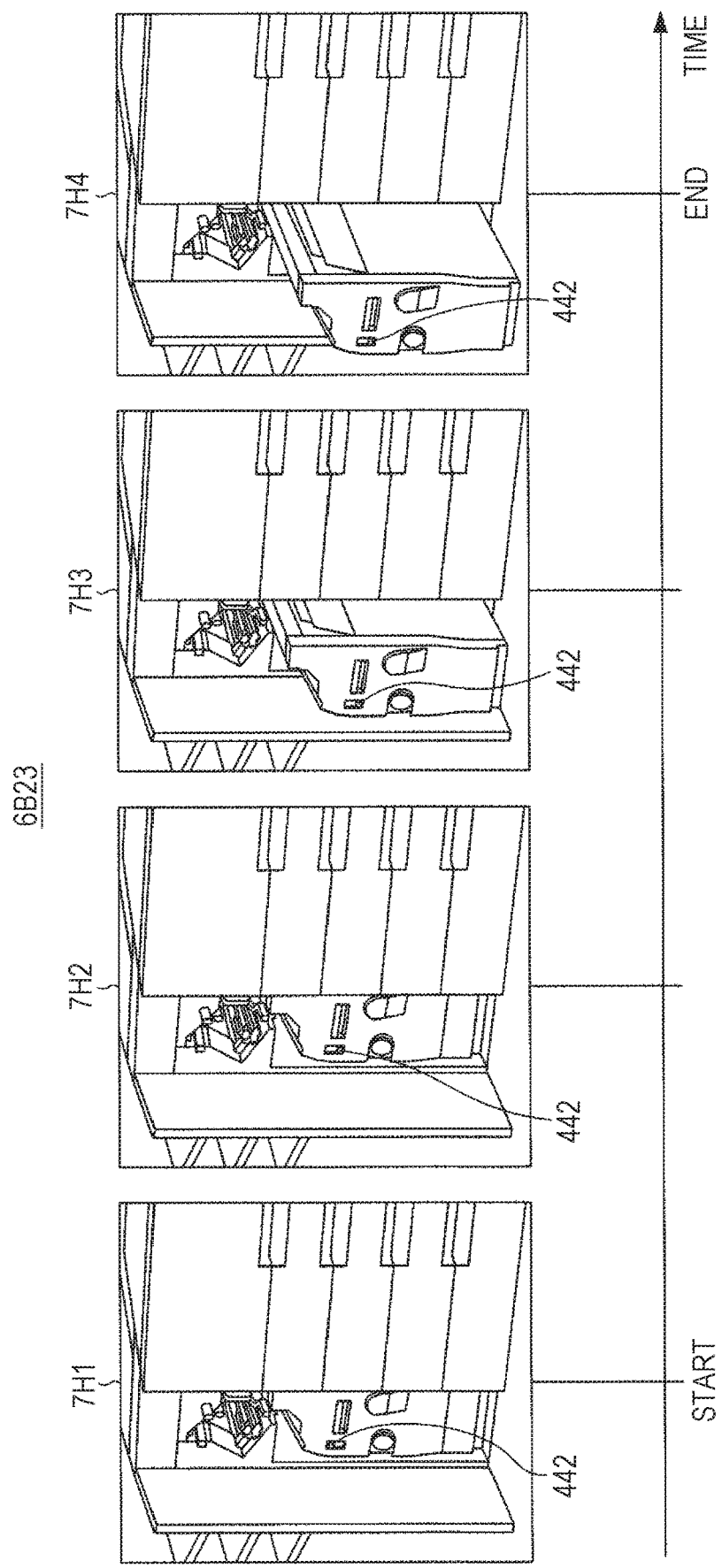

FIG. 14
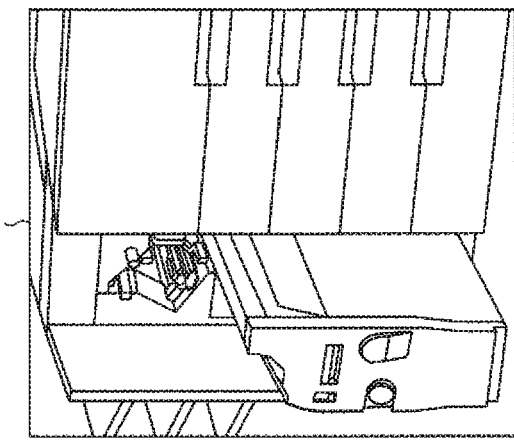
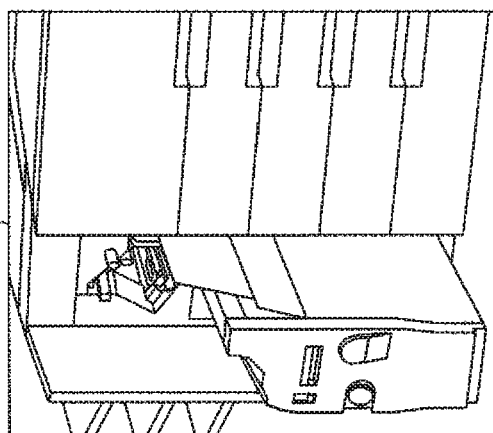
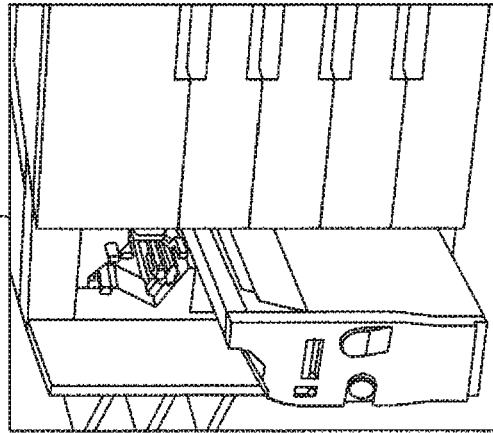

FIG. 17A
104

| MAINTENANCE | STEP | | | | | | |
|---|---|---|---|---|---|---|---|
| | 1 | 2 | 3 | 4 | 5 | 6 | ~6C1, 6C |
| ELIMINATION OF PAPER JAM IN FIXING UNIT | 0 | 0 | 0 | 0 | 0 | – | |
| ELIMINATION OF PAPER JAM IN HOLE PUNCHER | 0 | 0 | 0 | 0 | 0 | 0 | ~6C2, 6C |
| ... | ... | ... | ... | ... | ... | ... | |

| MAINTENANCE | STEP | | | | | | |
|---|---|---|---|---|---|---|---|
| | 1 | 2 | 3 | 4 | 5 | 6 | ~6C1, 6C |
| ELIMINATION OF PAPER JAM IN FIXING UNIT | 1 | 1 | 1 | 1 | 0 | – | |
| ELIMINATION OF PAPER JAM IN HOLE PUNCHER | 0 | 0 | 0 | 1 | 1 | 0 | ~6C2, 6C |
| ... | ... | ... | ... | ... | ... | ... | |

6D21, 6D  6D22, 6D  6D23, 6D  6D24, 6D  6D25, 6D  6D26, 6D

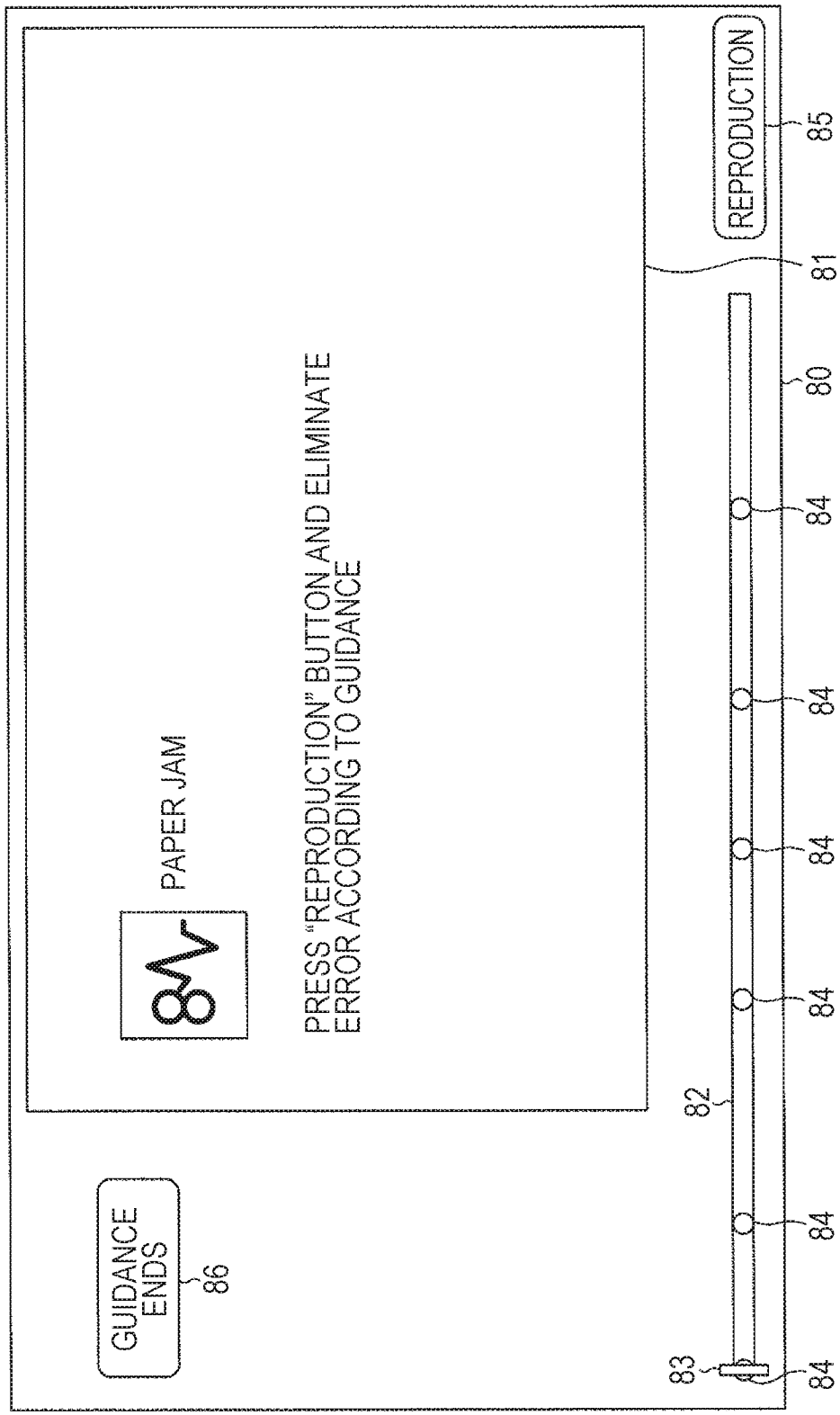

MOVING IMAGE REPRODUCTION APPARATUS, CANDIDATE JUMP DESTINATION DISPLAY METHOD, AND COMPUTER PROGRAM

The entire disclosure of Japanese patent Application No. 2016-221801, filed on Nov. 14, 2016, is incorporated herein by reference in its entirety.

BACKGROUND

Technological Field

The present invention relates to a technique for reproducing guidance of maintenance or the like.

Description of the Related Art

In recent years, image formation apparatuses including various functions such as copy, network print, facsimile, scan, and file server have been widely used. The image formation apparatuses are called "multi-purpose machine" or "Multi Function Peripherals (MFP)." Various functions are mounted and the configuration is complicated, and a user needs to perform complicated works for an occurring error or maintenance.

The following technique is proposed in order to present guidance of complicated works to a user in a comprehensible way.

An image formation apparatus described in JP 2015-116723 A stores a moving image recording maintenance procedures in association with the chapters indicating the recording positions where the remarkable procedures are recorded among the maintenance procedures recorded in the moving image in a storage. The image formation apparatus acquires information on failures. A type of a maintenance is specified on the basis of the information and one or more moving images are specified depending on the type of the maintenance from among the moving images stored in the storage. The specified moving images are reproduced in a predetermined reproduction order and the chapters of the moving images are displayed on a display unit to be selectable. When a chapter displayed on the display device is selected via an input device, the image formation apparatus changes the reproduction position of the moving image at that time to the recording position indicated by the chapter.

The chapters are arranged on a bar. The bar is generally called "progress bar" or "seek bar."

Conventionally, a user can designate a time (position) to reproduce a moving image by selecting a corresponding position on a bar.

According to the conventional technique, however, the user cannot easily select a desired position by use of the bar.

SUMMARY

An object of the present invent is to enable a user to more easily select a time to reproduce a moving image on a bar than ever in terms of the above problem.

To achieve the abovementioned object, according to an aspect of the present invention, a moving image reproduction apparatus for reproducing a moving image for explaining a work including a plurality of steps, reflecting one aspect of the present invention comprises:

a reproducer that reproduces the moving image;
a progress display that displays an indicator indicating a progress of reproduction of the moving image and a position on the indicator where the moving image is being currently reproduced; and
a candidate display that displays a candidate image corresponding to at least one jump destination included in the moving image when a predetermined operation is performed on the indicator.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram illustrating exemplary state change data;
FIG. 6 is a diagram illustrating exemplary frames of part of a moving image reproduced by step data;
FIG. 7 is a diagram illustrating exemplary frames of part of a moving image reproduced by step data;
FIG. 8 is a diagram illustrating exemplary frames of part of a moving image reproduced by step data;
FIG. 9 is a diagram illustrating exemplary frames of part of a moving image reproduced by step data;
FIG. 10 is a diagram illustrating exemplary frames of part of a moving image reproduced by step data;
FIG. 11 is a diagram illustrating exemplary frames of part of a moving image reproduced by step data;
FIG. 12 is a diagram illustrating exemplary frames of part of a moving image reproduced by step data;
FIG. 13 is a diagram illustrating exemplary frames of part of a moving image reproduced by step data;
FIG. 14 is a diagram illustrating exemplary frames of part of a moving image reproduced by step data;
FIGS. 17A and 17B are diagrams illustrating exemplary progress data;
FIG. 18 is a diagram illustrating an exemplary display form of a guidance screen immediately after an error occurs.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
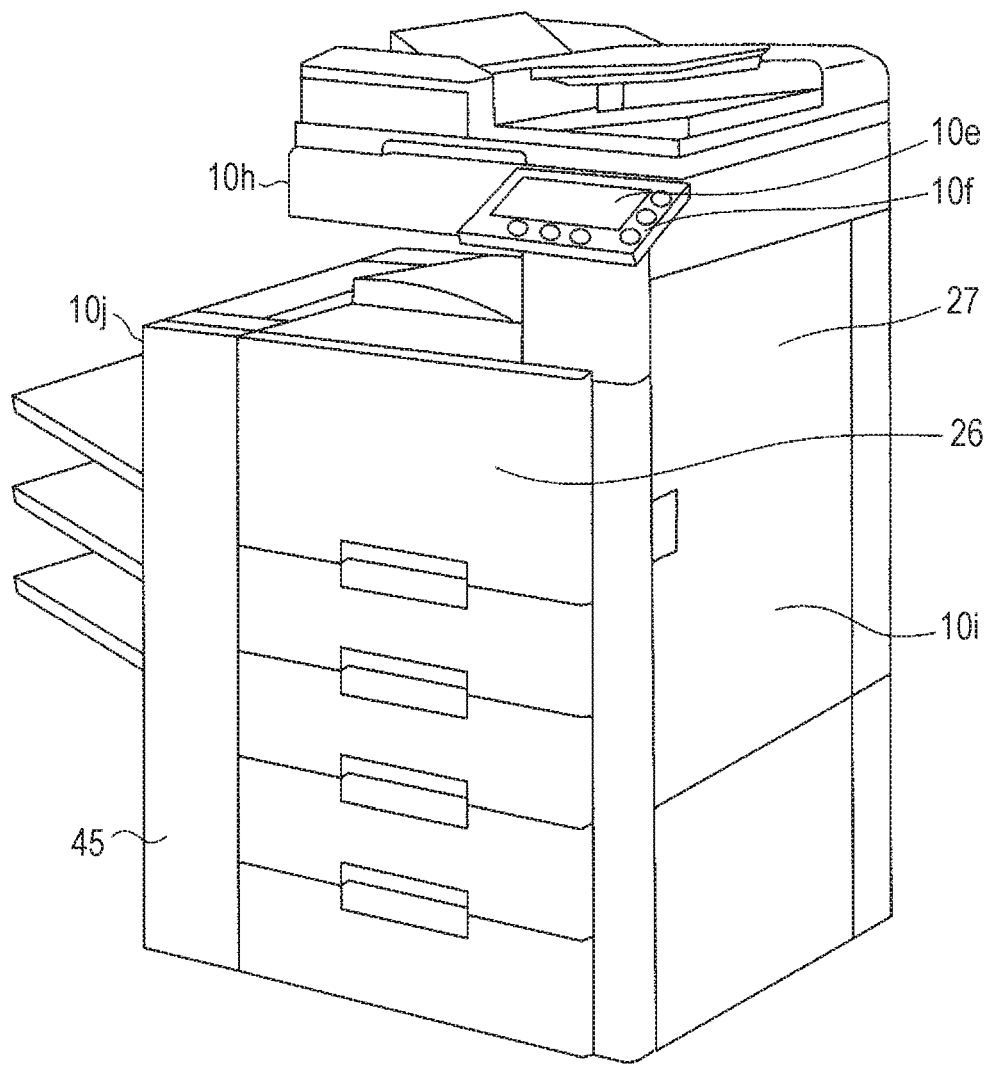
FIG. 1 is a diagram illustrating an exemplary appearance of an image formation apparatus.
Figure 2:
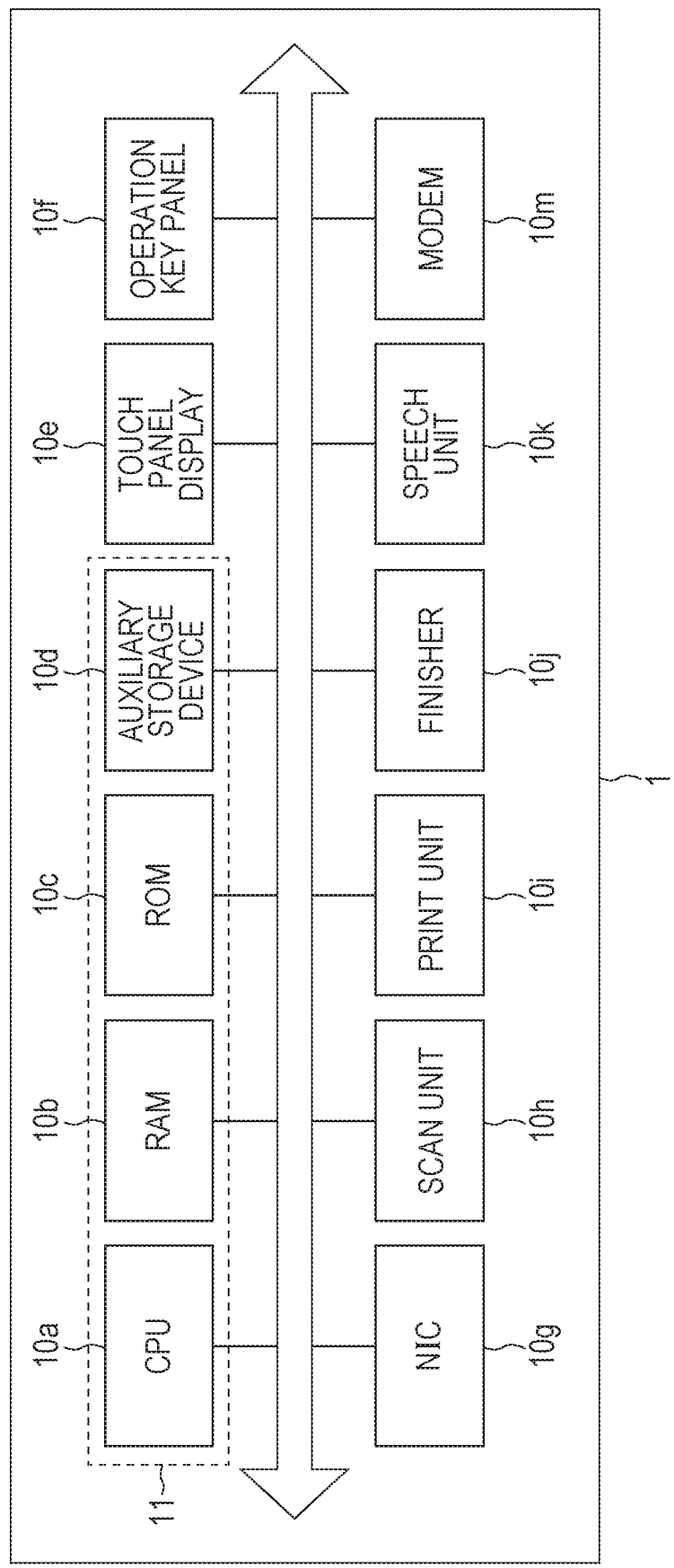
FIG. 2 is a diagram illustrating an exemplary hardware configuration of the image formation apparatus.
Figure 3:
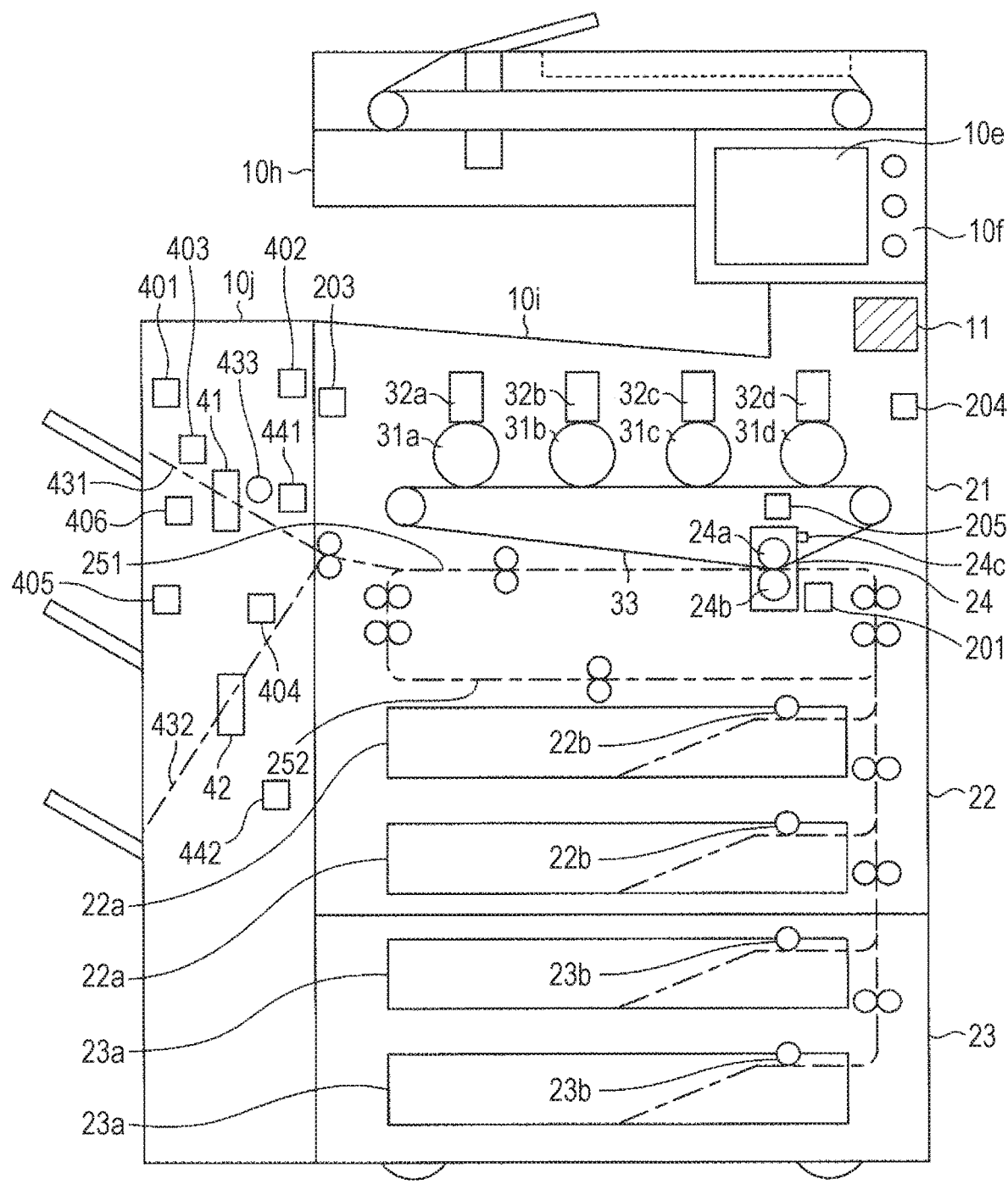
FIG. 3 is a diagram mainly illustrating an exemplary configuration of a print unit and a finisher.
Figure 4:
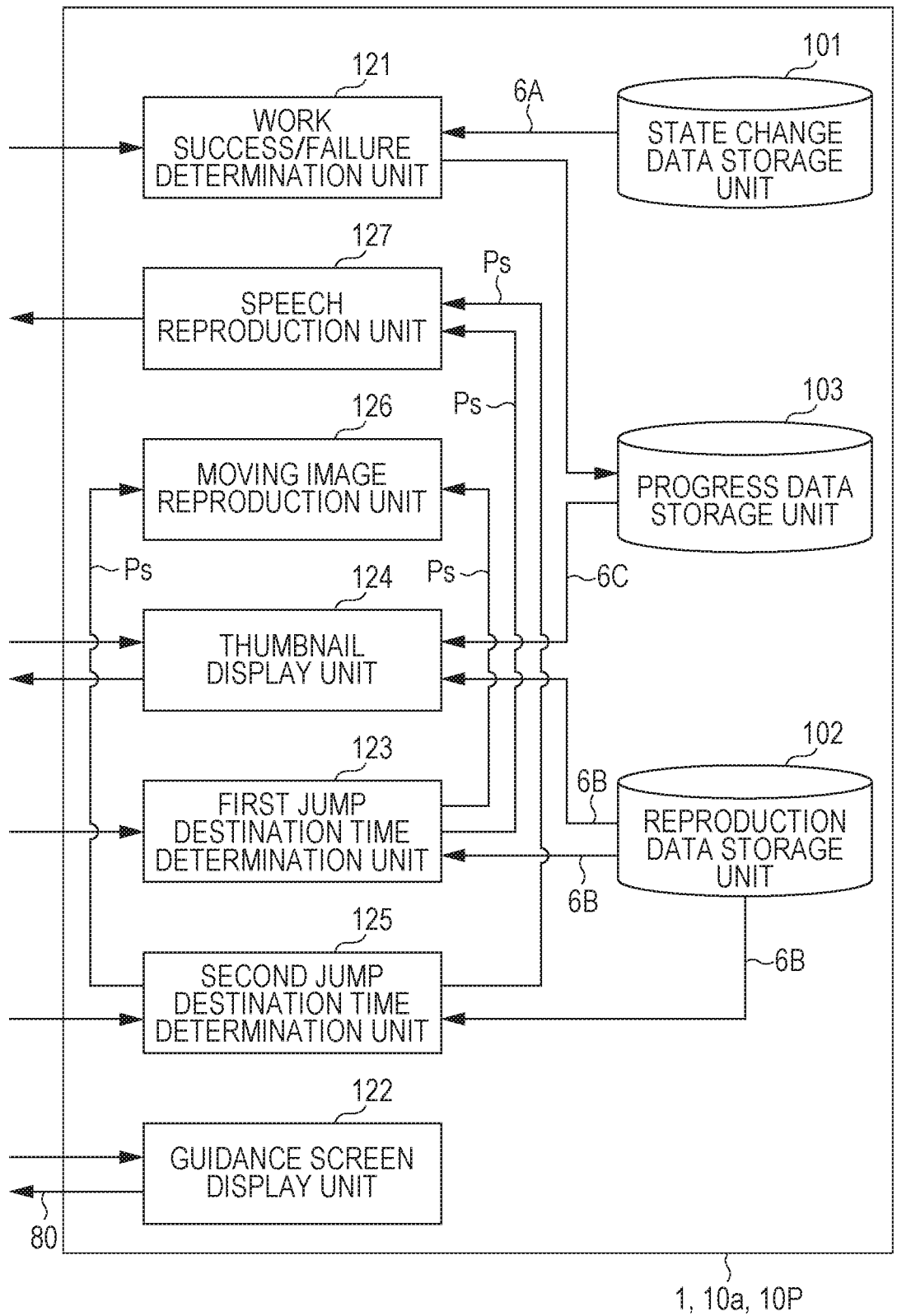
FIG. 4 is a diagram illustrating an exemplary functional configuration of the image formation apparatus.

FIG. 1 is a diagram illustrating an exemplary appearance of an image formation apparatus 1. FIG. 2 is a diagram illustrating an exemplary hardware configuration of the image formation apparatus 1. FIG. 3 is a diagram mainly illustrating an exemplary configuration of a print unit 10*i* and a finisher 10*j*. FIG. 4 is a diagram illustrating an exemplary functional configuration of the image formation apparatus 1.

The image formation apparatus 1 illustrated in FIG. 1 is an apparatus including the functions such as copy, PC print, facsimile, scanner and box, and may be generally called "multi-purpose machine" or "Multi Function Peripherals (MFP)."

The PC print function is a function of printing an image on a sheet on the basis of image data received from a terminal device, and may be called "network printing" or "network print."

The box function is such that a storage area called "box" or "personal box" is given to each user and each user stores and manages image data and the like in his/her own storage area. A box can be provided for each group and can be shared among the members of each group. The box corresponds to "folder" or "directory" in a personal computer.

The image formation apparatus 1 is configured of a control unit 11, a touch panel display 10*e*, an operation key panel 10*f*, a Network Interface Card (NIC) 10*g*, a scan unit 10*h*, the print unit 10*i*, the finisher 10*j*, a speech unit 10*k*, and a modem 10*m* as illustrated in FIG. 1 to FIG. 3.

The touch panel display 10*e* displays a screen on which a message for a user is indicated, a screen on which a user inputs a command or information, and a screen on which a result of a processing performed by the control unit 11 is indicated. The touch panel display 10*e* further displays a moving image of the operation guidance of the image formation apparatus 1. Further, the touch panel display 10*e* sends a signal indicating a touched position to the control unit 11.

The operation key panel 10*f* is a hardware keyboard, and is configured of numerical keys, start key, stop key, function keys, and the like.

The NIC 10*g* makes communication with other devices in a protocol such as Transmission Control Protocol/Internet Protocol (TCP/IP).

The modem 10*m* exchanges image data with a facsimile terminal in a protocol such as G3.

The scan unit 10*h* reads an image drawn on a sheet set on a platen glass and generates image data.

The print unit 10*i* is configured of an image formation unit 21, a sheet feeder 22, a sheet cabinet 23, a fixing unit 24, a printed material carrying path 251, a feedback carrying path 252, a front door 26, a side door 27, a carrying path sensor 201, a front door sensor 203, a side door sensor 204, a lever sensor 205, and the like. With the configuration, images received from other device via the NIC 10*g* are printed on a sheet in addition to images read by the scan unit 10*h*.

The image formation unit 21 is a color print engine in a tandem system or electrophotographic system, and is configured of photosensitive drums 31*a*, 31*b*, 31*c*, 31*d*, exposure scan units 32*a*, 32*b*, 32*c*, 32*d*, and a transfer belt 33.

The photosensitive drums 31*a*, 31*b*, 31*c*, and 31*d* correspond to yellow, magenta, cyan, and black, respectively. Similarly, the exposure scan units 32*a*, 32*b*, 32*c*, and 32*d* correspond to yellow, magenta, cyan, and black, respectively.

The exposure scan units 32*a*, 32*b*, 32*c*, and 32*d* expose according to an image to be printed in response to a signal from the control unit 11 thereby to form an electrostatic latent image on the photosensitive drums 31*a*, 31*b*, 31*c*, and 31*d*, respectively. The toners of the respective colors are adhered thereon.

The toner images of the respective colors formed on the photosensitive drums 31*a*, 31*b*, 31*c*, and 31 are overlapped on the transfer belt 33. Thereby, a full-color toner image is formed on the transfer belt 33.

The sheet feeder 22 is mounted as standard on the image formation apparatus 1, and is directed for feeding a sheet to the image formation unit 21. The sheet feeder 22 is configured of one or more sheet cassettes 22*a* and a pickup roller 22*b*. The sheet cassette 22*a* houses sheets therein. The pickup roller 22*b* picks up the sheets from the sheet cassette 22*a* one by one, and carries it to the image formation unit 21.

The sheet cabinet 23 is directed for feeding a sheet to the image formation unit 21 similarly to the sheet feeder 22, and is mounted as option on the image formation apparatus 1. A sheet fed out from the sheet cassette 23*a* in the sheet cabinet 23 by the pickup roller 23*b* is supplied to the image formation unit 21 via the sheet feeder 22.

The fixing unit 24 is configured of two heating rollers 24*a*, 24*b*, and a lever 24*c*. The toner image formed on the transfer belt 33 is transferred onto the sheet fed out from the sheet feeder 22 or the sheet cabinet 23 by the two heating rollers 24*a* and 24*b*. The lever 24*c* is lowered so that the two heating rollers 24*a* and 24*b* are separated from each other, and the lever 24*c* is raised so that the two heating rollers are pressurized to each other.

Additionally, the fixing unit 24 is provided with a temperature sensor. The temperature sensor measures the temperatures of the heating rollers 24*a* and 24*b*, and notifies the result to the control unit 11.

The printed material carrying path 251 carries a printed material onto which the toner image is transferred by the fixing unit 24 to the finisher 10*j*.

The front door 26 is installed on the front of the image formation apparatus 1. A job such as printing is performed while the front door 26 is closed. A maintenance such as elimination of error or resupply of consumables is performed while the front door 26 is opened as needed.

The side door 27 is installed on the right of the image formation apparatus 1. A job such as printing is performed while the side door 27 is closed. A maintenance is performed while the side door 27 is opened as needed.

The carrying path sensor 201 is arranged near the fixing unit 24, and detects the presence of a sheet in the fixing unit 24 or its near carrying path. The carrying path sensor 201 further detects a paper jam (jam) occurring in the fixing unit 24 or its near carrying path.

The front door sensor 203 is installed near the front door 26, and detects the open/close state of the front door 26. The side door sensor 204 is installed near the side door 27, and detects the open/close state of the side door 27.

The lever sensor 205 detects a state of the lever 24*c*, or whether the lever 24*c* is raised or lowered.

The finisher 10*j* is configured of a stapler 41, a hole puncher 42, a first printed material carrying path 431, a second printed material carrying path 432, a dial 433, a first lever 441, a second lever 442, a front door 45, a front door sensor 401, a first lever sensor 402, a first carrying path sensor 403, a second lever sensor 404, a second carrying path sensor 405, and an attachment/detachment sensor 406. With the configuration, the finisher 10*j* performs a post-processing on a printed material obtained by the print unit 10*i* as needed.

The first printed material carrying path 431 carries a printed material to the stapler 41. The stapler 41 performs a post-processing of stapling a plurality of printed materials carried via the first printed material carrying path 431.

The front door 45 is installed on the front of the finisher 10j. A job such as printing is performed while the front door 45 is closed. A maintenance such as elimination of error or resupply of consumables is performed while the front door 45 is opened as needed.

When a paper jam occurs in or near the stapler 41, the user opens the front door 45 and removes the sheet.

The second printed material carrying path 432 carries a printed material to the hole puncher 42. The hole puncher 42 performs a post-processing of punching one or more printed materials carried via the second printed material carrying path 432.

The hole puncher 42, the second carrying path sensor 405, the second printed material carrying path 432, and the second lever 442 are housed in a drawer-like case.

When a paper jam occurs in or near the hole puncher 42, the first lever 441 is lowered to open the guide to the second printed material carrying path 432 and the dial 433 is turned in a predetermined direction to discharge the sheet. Alternatively, the user lowers the second lever 442 to unlock the case. The case is then drawn to take up and remove the sheet.

The front door sensor 401 detects the open/close state of the front door 45. The first carrying path sensor 403 detects the presence of a sheet in or near the stapler 41.

The first lever sensor 402 detects whether the first lever 441 is raised or lowered. The second lever sensor 404 detects whether the second lever 442 is raised or lowered. The second carrying path sensor 405 detects the presence of a sheet in or near the hole puncher 42.

The attachment/detachment sensor 406 detects whether the case of the hole puncher 42 is mounted on the main body of the image formation apparatus 1.

The speech unit 10k is configured of a sound board, a speaker, and a microphone, outputs speech of guidance, or collects speech of a user.

The control unit 11 is configured of a Central Processing Unit (CPU) 101, a Random Access Memory (RAM) 10b, a Read Only Memory (ROM) 10c, and an auxiliary storage device 10d.

The ROM 10c or the auxiliary storage device 10d stores the programs for realizing the respective functions such as copy. Further, a guidance reproduction program 10P (see FIG. 4) is stored therein.

The guidance reproduction program 10P is directed for reproducing a moving image and speech of guidance for explaining to the user how to perform a maintenance such as elimination of error or resupply of consumables.

The programs are loaded into the RAM 10b as needed and are executed by the CPU 10a. The auxiliary storage device 10d employs a hard disc drive or Solid State Drive (SDD).

A state change data storage unit 101, a reproduction data storage unit 102, a progress data storage unit 103, a step completion detector 121, a guidance screen display unit 122, a first jump destination time determination unit 123, a thumbnail display unit 124, a second jump destination time determination unit 125, a moving image reproduction unit 126, and a speech reproduction unit 127 illustrated in FIG. 4 are realized by the guidance reproduction program 10P.

The state change data storage unit 101 to the speech reproduction unit 127 will be described below with reference to FIG. 5 to FIG. 20.

FIG. 5 is a diagram illustrating exemplary state change data 6A. FIG. 6 is a diagram illustrating exemplary frames of part of a moving image reproduced by step data 6B 11. FIG. 7 is a diagram illustrating exemplary frames of part of a moving image reproduced by step data 6B 12. FIG. 8 is a diagram illustrating exemplary frames of part of a moving image reproduced by step data 6B 13. FIG. 9 is a diagram illustrating exemplary frames of part of a moving image reproduced by step data 6B 14. FIG. 10 is a diagram illustrating exemplary frames of part of a moving image reproduced by step data 6B 15.

Generally, a plurality of steps (phases) are performed in a predefined procedure or in a correct procedure by a user and a maintenance is completed.

According to the present embodiment, it is confirmed that one step is correctly performed on the basis of the detection results of one or more sensors in the image formation apparatus 1.

The state change data storage unit 101 previously stores the state change data 6A per maintenance as illustrated in FIG. 5.

The state change data 6A indicates a change in state detected by any sensor (states before and after change) in the order of steps when a maintenance is performed in a correct procedure. The state change data 6A per maintenance will be discriminated and denoted as "state change data 6A1," "state change data 6A2," . . . below.

For example, the state change data 6A 1 is the state change data 6A of a maintenance of "eliminating a paper jam in the fixing unit."

According to the state change data 6A1, a change in state when the maintenance is correctly performed and a sensor for detecting the same are indicated as follows for each of the five steps of the maintenance.

The first step is a work of opening the side door 27. A change detected when the step is performed is "the side door 27 changes from closed to opened." This is detected by the side door sensor 204.

The second step is a work of lowering the lever 24c. A change detected when the step is performed is "the lever 24c changes from raised to lowered." This is detected by the lever sensor 205.

The third step is a work of removing a sheet. A change detected when the step is performed is "the fixing unit 24 changes from sheet present to sheet absent." This is detected by the carrying path sensor 201.

The fourth step is a work of raising the lever 24c. A change detected when the step is performed is "the lever 24c changes from lowered to raised." This is detected by the lever sensor 205.

The fifth step is a work of closing the side door 27. A change detected when the step is performed is "the side door 27 changes from opened to closed." This is detected by the side door sensor 204.

The state change data 6A2 is the state change data 6A of a maintenance of "eliminating a paper jam in the hole puncher."

According to the state change data 6A2, a change in state when the maintenance is correctly performed and a sensor for detecting the same are indicated as follows for each of the six steps of the maintenance.

The first step is a work of opening the front door 45. A change detected when the step is performed is "the front door 45 changes from closed to opened." This is detected by the front door sensor 401.

The second step is a work of lowering the first lever 441 to open the guide, turning the dial 433 in order to discharge a sheet jammed on the downstream of the hole puncher 42, and raising the first lever 441 to close the guide. A change detected when the step is performed is "the first lever 441 changes from raised to lowered, a sheet changes from present to absent while a paper jam is occurring on the downstream of the hole puncher 42, and the first lever 441 changes from lowered to raised." A change in state of the first lever 441 is detected by the first lever sensor 402. A change in the presence of a sheet is detected by the second carrying path sensor 405.

The third step is a work of lowering the second lever 442 to draw the case of the hole puncher 42. A change detected when the step is performed is "the second lever 442 changes from raised to lowered and the case of the hole puncher 42 changes from mounted to removed." A change in state of the second lever 442 is detected by the second lever sensor 404. A change in state of the case of the hole puncher 42 is detected by the attachment/detachment sensor 406.

The fourth step is a work of removing a sheet when the sheet is jammed in the hole puncher 42. A change detected when the step is performed is "a change from sheet present to sheet absent." This is detected by the second carrying path sensor 405.

The fifth step is a work of mounting the case of the hole puncher 42 on the main body of the image formation apparatus 1 to raise the second lever 442. A change detected when the step is performed is "the case of the hole puncher 42 changes from removed to mounted and the second lever 442 changes from lowered to raised." A change in state of the case of the hole puncher 42 is detected by the attachment/detachment sensor 406. A change in state of the second lever 442 is detected by the second lever sensor 404.

The sixth step is a work of closing the front door 45. A change detected when the step is performed is "the front door 45 changes from opened to closed." This is detected by the front door sensor 401.

There is a change which is not detected even when a step is completed. A change from sheet present on the downstream of the hole puncher 42 to sheet absent in the second step of "eliminating a paper jam in the hole puncher" and a change from sheet present in the hole puncher 42 to sheet absent in the fourth step are not detected. The changes are discriminated from the other changes. The changes are in brackets in FIG. 5.

Further, a corresponding error 6AH is indicated in the state change data 6A. For example, a corresponding error 6AH 1 as a corresponding error 6AH is indicated in the state change data 6A 1. "Corresponding error" is an error for which a maintenance based on the state change data 6A needs to be performed. That is, for example, the corresponding error 6AH 1 indicates that a maintenance of "eliminating a paper jam in the fixing unit" needs to be performed when an error of "a paper jam in the fixing unit" occurs.

The reproduction data storage unit 102 previously stores guidance data 6B per guidance. That is, the guidance data 6B corresponding to each item of state change data 6A is stored. In the following, the guidance data 6B corresponding to the state change data 6A 1, the state change data 6A2, . . . may be discriminated and denoted as "guidance data 6B1," "guidance data 6B2," . . . , respectively.

The guidance data 6B is data on the moving image and speech for explaining a flow of a maintenance, and is configured of step data per step. Guidance is configured of chapters per step of a maintenance.

For example, the guidance data 6B corresponding to the state change data 6A 1, or the guidance data 6B 1 includes five items of step data 6B11 to 6B15. The step data 6B11 to 6B 15 are data for reproducing the moving images and speech of the first to fifth chapters.

A moving image is reproduced as illustrated in FIG. 6 according to the step data 6B 11. That is, a moving image is reproduced during transition from a state in which the side door 27 is closed (image 7A1) via a state in which the side door 27 is slightly opened (image 7A2) and a state in which the side door 27 is two-thirds opened (image 7A3) to a state in which the side door 27 is fully opened (image 7A4).

The images 7A1 to 7A4 are frames of a moving image. The images 7B1 to 7B3, 7C1 to 7C4, 7D1 to 7D3, 7E1 to 7E4, 7F1 to 7F3, 7G1 to 7G4, 7H1 to 7H4, 7J1 to 7J3, 7K1 to 7K4, and 7L1 to 7L3 described below are also frames.

Speech corresponding to the moving image is reproduced according to the step data 6B 11. This is similarly applicable to step data described below.

A moving image is reproduced as illustrated in FIG. 7 according to the step data 6B 12. That is, a moving image is reproduced during transition from a state in which the side door 27 is fully opened and the lever 24c is raised (image 7B1) via a state in which the lever 24c is half lowered (image 7B2) to a state in which the heating rollers 24a and 24b are separated from each other and the lever 24c is fully lowered (image 7B3).

A moving image is reproduced as illustrated in FIG. 8 according to the step data 6B 13. That is, a moving image is reproduced during transition from a state in which the heating rollers 24a and 24 are separated from each other and a sheet is jammed therebetween (image 7C 1) via a state in which the sheet is slightly drawn between the heating rollers 24a and 24b (image 7C2) and a state in which the sheet is considerably drawn between the heating rollers 24a and 24b (image 7C3) to a state in which the sheet is not jammed between the heating rollers 24a and 24b (image 7C4).

A moving image is reproduced as illustrated in FIG. 9 according to the step data 6B 14. That is, a moving image is reproduced during transition from a state in which the heating rollers 24a and 24b are separated from each other and the lever 24c is fully lowered (image 7D 1) via a state in which the lever 24c is half raised (image 7D2) to a state in which the lever 24c is fully raised (image 7D3).

A moving image is reproduced as illustrated in FIG. 10 according to the step data 6B 15. That is, a moving image is reproduced during transition from a state in which the side door 27 is fully opened (image 7E1) via a state in which the side door 27 is slightly closed (image 7E2) and a state in which the side door 27 is two-thirds closed (image 7E3) to a state in which the side door 27 is fully closed (image 7E4).

Figure 15:
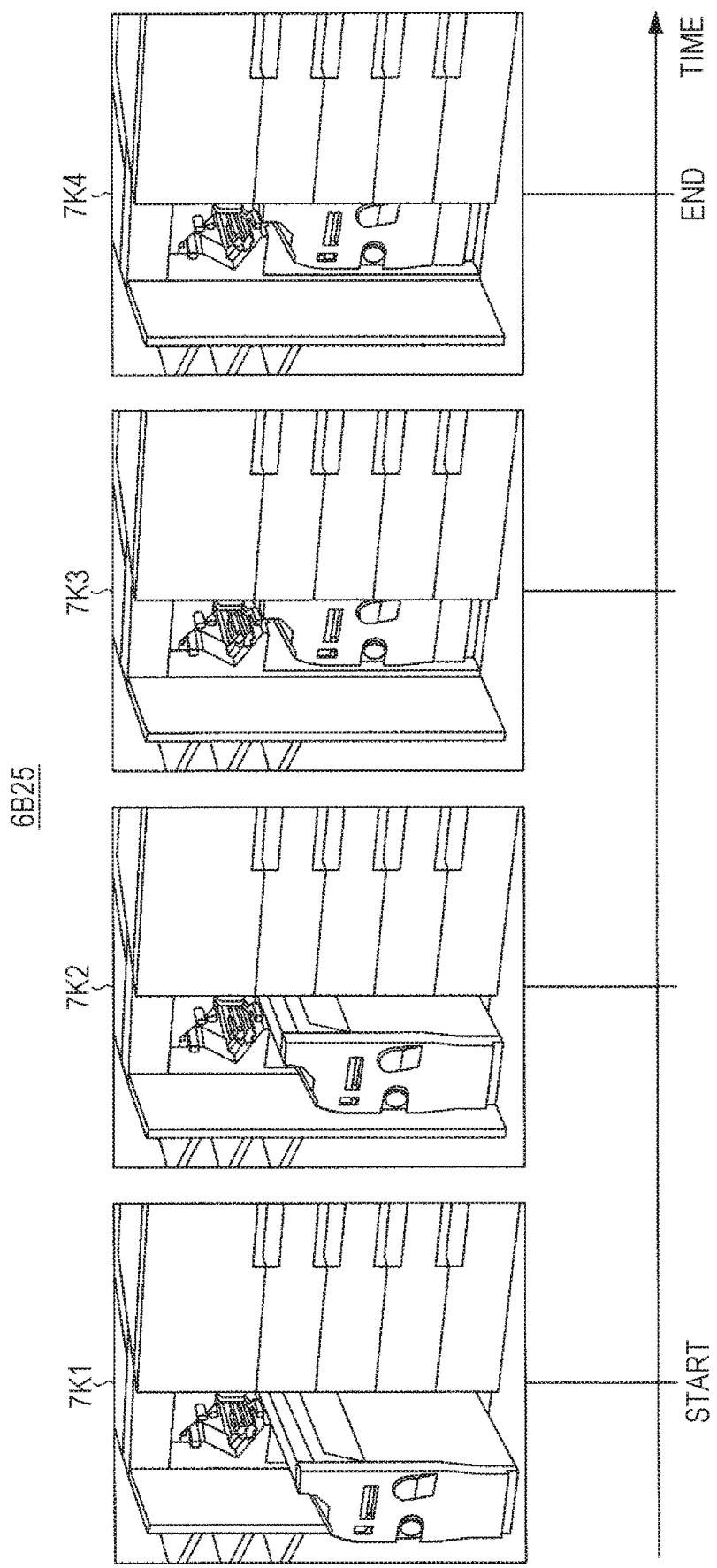
FIG. 15 is a diagram illustrating exemplary frames of part of a moving image reproduced by step data.
Figure 16:
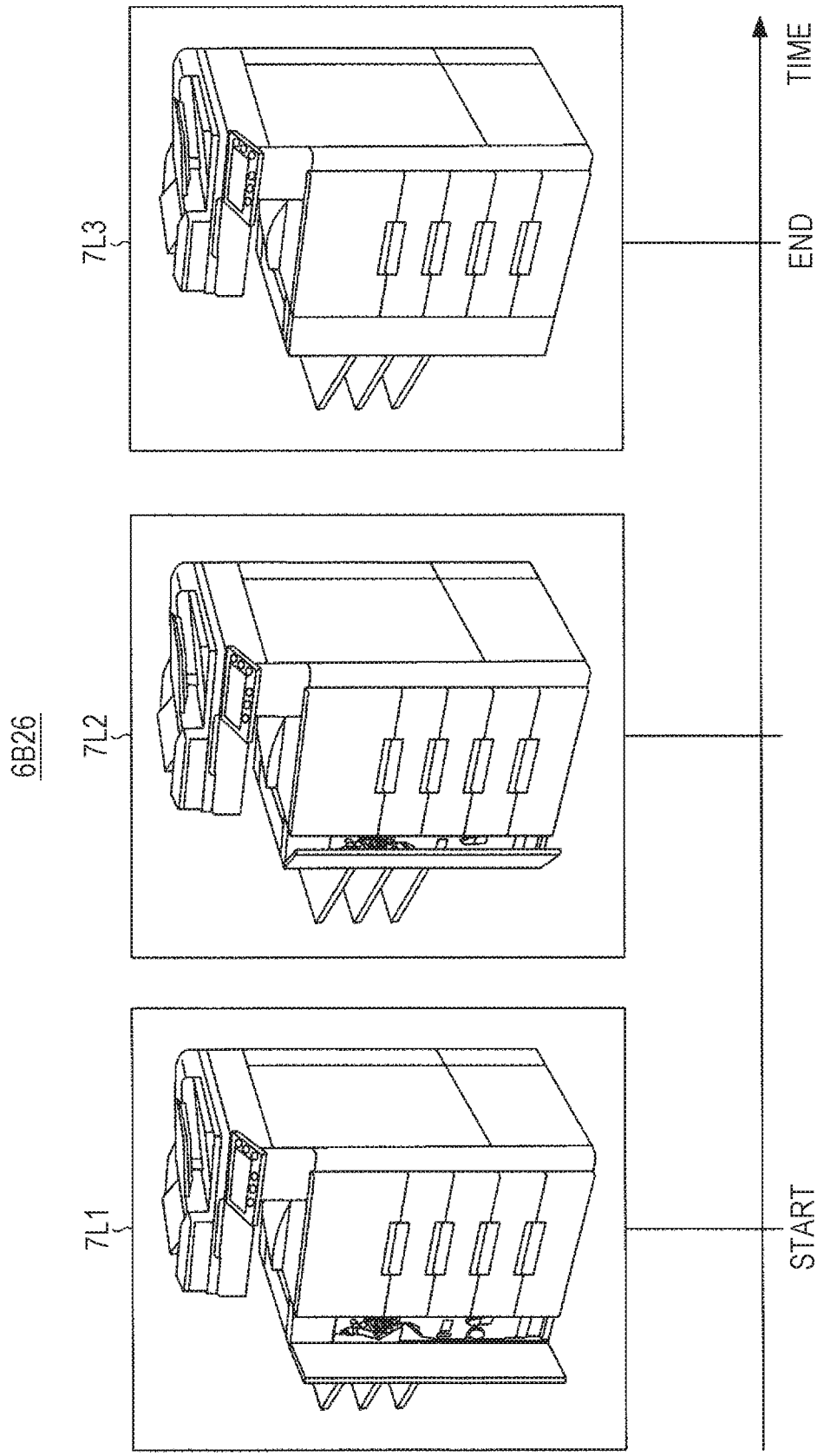
FIG. 16 is a diagram illustrating exemplary frames of part of a moving image reproduced by step data.

FIG. 11 is a diagram illustrating exemplary frames of part of a moving image reproduced by step data 6B21. FIG. 12 is a diagram illustrating exemplary frames of part of a moving image reproduced by step data 6B22. FIG. 13 is a diagram illustrating exemplary frames of part of a moving image reproduced by step data 6B23. FIG. 14 is a diagram illustrating exemplary frames of part of a moving image reproduced by step data 6B24. FIG. 15 is a diagram illustrating exemplary frames of part of a moving image reproduced by step data 6B25. FIG. 16 is a diagram illustrating exemplary frames of part of a moving image reproduced by step data 6B26.

Alternatively, the guidance data 6B corresponding to the state change data 6A2, or the guidance data 6B2 includes the six items of step data 6B21 to 6B26. The step data 6B21 to 6B26 are directed for reproducing the moving images and speech of the first to sixth chapters.

A moving image is reproduced as illustrated in FIG. 11 according to the step data 6B21. That is, a moving image is reproduced during transition from a state in which the front door 45 is closed (image 7F1) via a state in which the front door 45 is half opened (image 7F2) to a state in which the front door 45 is fully opened (image 7F3).

A moving image is reproduced as illustrated in FIG. 12 according to the step data 6B22. That is, a moving image is reproduced during transition from a state in which the first lever 441 is raised (image 7G1) via a state in which the first lever 441 is lowered (image 7G2) and a state in which the user turns the dial 433 (image 7G3) to a state in which the user stops turning the dial 433 to return the first lever 441 to the original position (image 7G4).

A moving image is reproduced as illustrated in FIG. 13 according to the step data 6B23. That is, a moving image is reproduced during transition from a state in which the second lever 442 is raised (image 7H 1) via a state in which the second lever 442 is lowered (image 7H2) and a state in which the case of the hole puncher 42 is half drawn (image 7H3) to a state in which the case of the hole puncher 42 is almost drawn (image 7H4).

A moving image is reproduced as illustrated in FIG. 14 according to the step data 6B24. That is, a moving image is reproduced during transition from a state in which a sheet is jammed in the hole puncher 42 (image 7J1) via a state in which the sheet is half drawn (image 7J2) to a state in which the sheet is fully removed (image 7J3).

A moving image is reproduced as illustrated in FIG. 15 according to the step data 6B25. That is, a moving image is reproduced during transition from a state in which the case of the hole puncher 42 is drawn (image 7K1) via a state in which the case of the hole puncher 42 is half housed (image 7K2) and a state in which the case of the hole puncher 42 is mounted on the main body (image 7K3) to a state in which the second lever 442 is raised (image 7K4).

A moving image is reproduced as illustrated in FIG. 16 according to the step data 6B26. That is, a moving image is reproduced during transition from a state in which the front door 45 is opened (image 7L1) via a state in which the front door 45 is half closed (image 7L2) to a state in which the front door 45 is fully closed (image 7L3).

Additionally, the start (head) time (position, point) of a moving image in each step in guidance is indicated in the step data of the step. For example, when the durations of the chapters of the five steps in the guidance reproduced according to the guidance data 6B 1 are "1 minutes 30 seconds," "45 seconds," "1 minute 45 seconds," "25 seconds," and "35 seconds," respectively, the start times "0 minute 0 second," "1 minute 30 seconds," "2 minutes 15 seconds, "3 minutes 20 seconds," and "3 minutes 45 seconds" are indicated for the step data 6B 11 to 6B15, respectively.

A time when a representative frame (image) of each step appears (which will be denoted as "representative time" below) is indicated for the step data of the step. For example, a time when the image 7C3 appears is indicated as a representative time of the third step of the maintenance of "eliminating a paper jam in the fixing unit."

Figure 19:
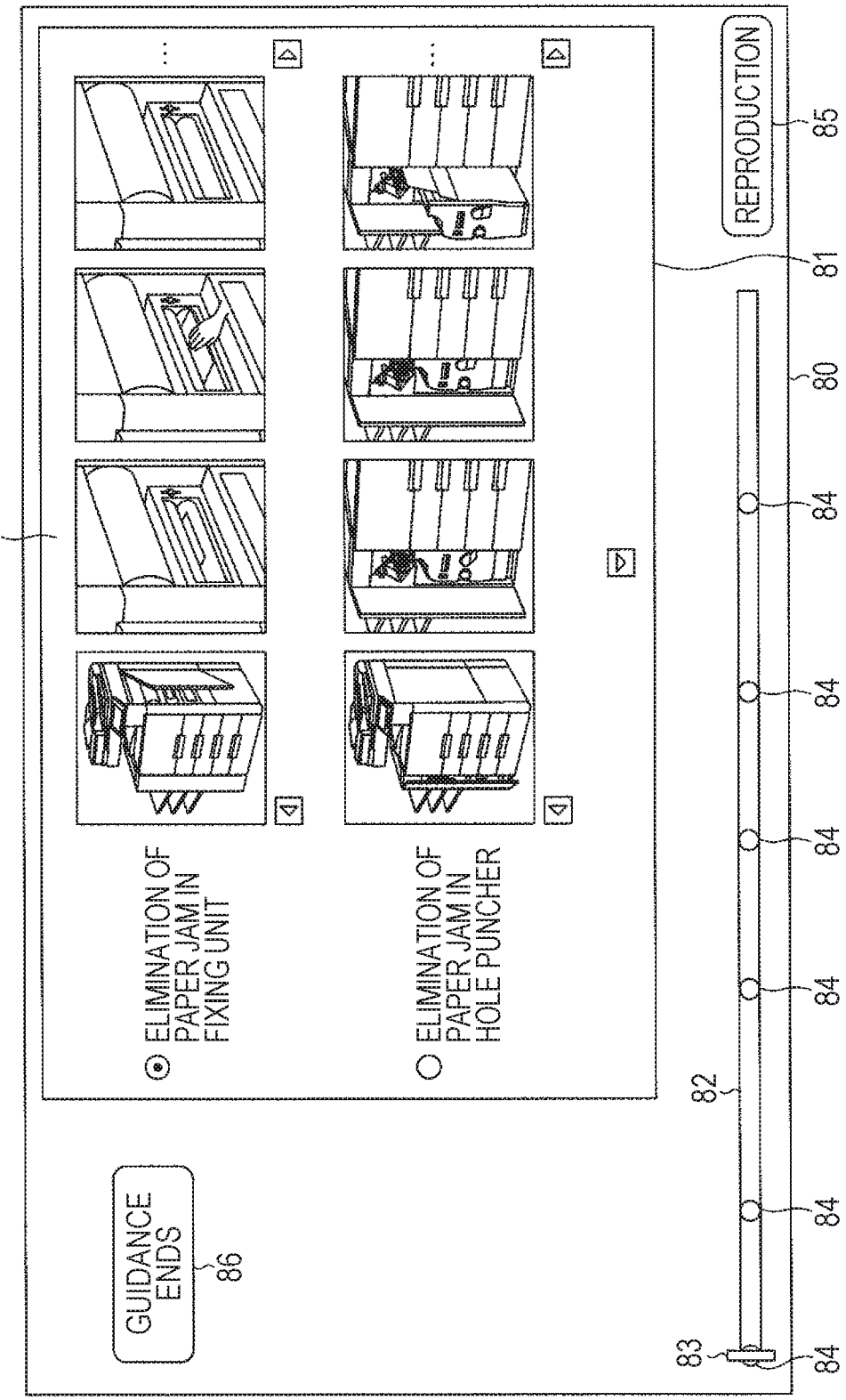
FIG. 19 is a diagram illustrating an exemplary display form of the guidance screen when a help command is input.
Figure 20:
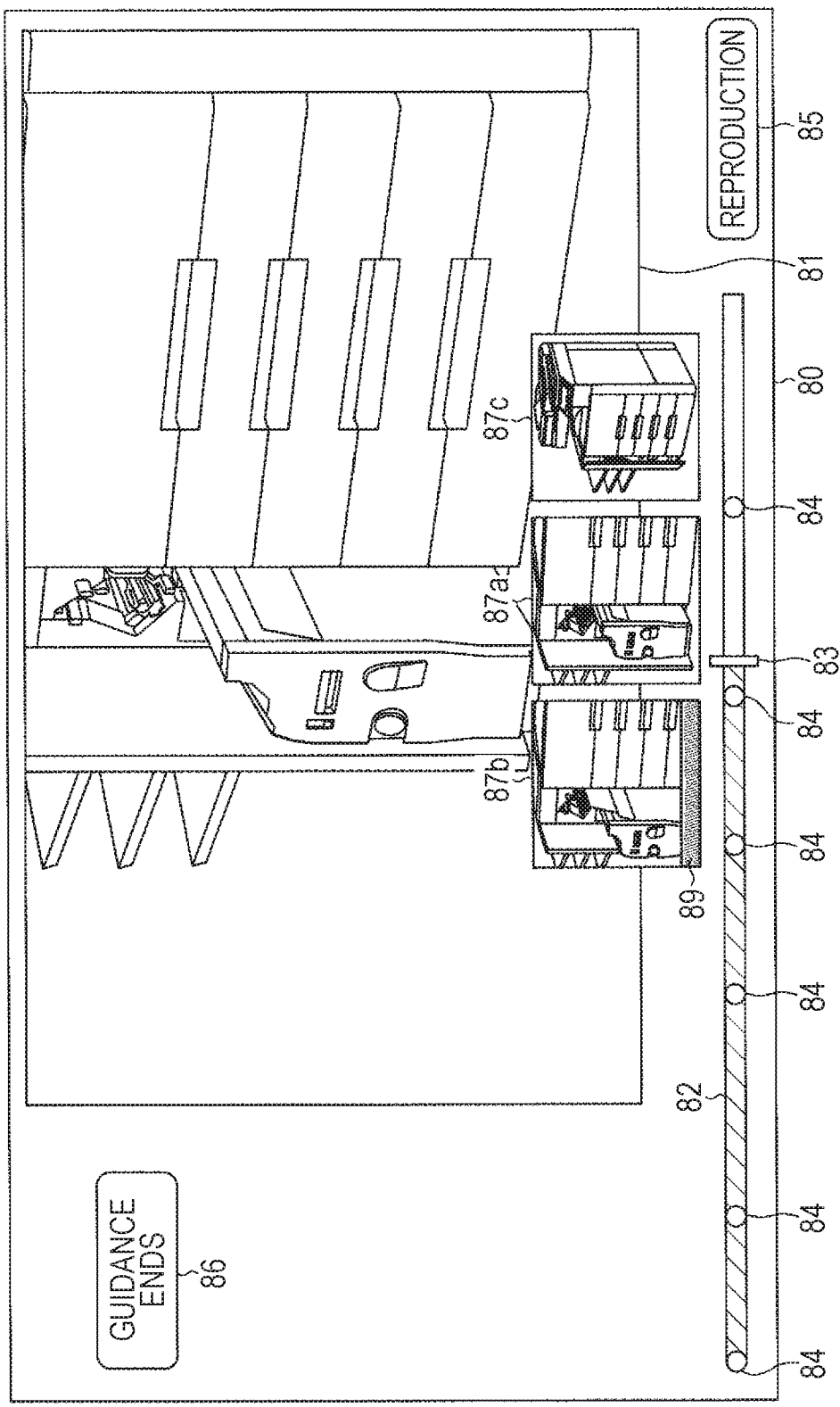
FIG. 20 is a diagram illustrating exemplary thumbnails.

FIGS. 17A and 17B are diagrams illustrating exemplary progress data 6C. FIG. 18 is a diagram illustrating an exemplary display form of a guidance screen 80 immediately after an error occurs. FIG. 19 is a diagram illustrating an exemplary display form of the guidance screen 80 when a help command is input. FIG. 20 is a diagram illustrating exemplary thumbnails 87a to 87c.

The progress data storage unit 103 stores the progress data 6C per state change data 6A as illustrated in FIG. 17A. The progress data 6C indicates a progress of a maintenance corresponding to the state change data 6A. In the following, the progress data 6C of the state change data 6A1, 6A2, . . . may be discriminated and denoted as "progress data 6C1," "progress data 6C2," . . . , respectively.

The progress data 6C includes a completion flag 6D per step of a maintenance. A completion flag 6D indicates whether a step is completed. A completion flag 6D of "1" indicates that a step is completed. A completion flag 6D of "0" indicates that a step has not been completed. Both the completion flags 6D have the initial value "0."

For example, the progress data 6C2 includes completion flags 6D21 to 6D26 as completion flags 6D of the six steps of eliminating a paper jam in the hole puncher 42.

The step completion detector 121 detects a completed step depending on a detection result of each sensor. The completion flag 6D of the step is then updated to "1." The state change data 6A defines how to update the completion flag 6D of a step depending on which change is detected by which sensor.

For example, if the front door sensor 401 detects that the front door 45 changes from closed to opened while the user is performing the maintenance of "eliminating a paper jam in the hole puncher," the step completion detector 121 determines that the first step is completed, and updates the completion flag 6D21 to "1" as illustrated in FIG. 17B.

Thereafter, when the first lever sensor 402 detects that the first lever 441 changes from raised to lowered, the second carrying path sensor 405 detects a change from sheet present to sheet absent, and the first lever sensor 402 detects that the first lever 441 changes from lowered to raised, the step completion detector 121 determines that the second step is completed, and updates the completion flag 6D22 to "1."

When a sheet is not jammed on the downstream of the hole puncher 42, a change from sheet present to sheet absent is not detected.

When it is detected that the first lever 441 changes from raised to lowered and it is detected that the first lever 441 changes from lowered to raised, the step completion detector 121 causes the second carrying path sensor 405 to detect the presence of a sheet. If an answer that no sheet is present is obtained, it is determined that the second step is completed, and the completion flag 6D22 is updated to "1."

Thereafter, when the second lever sensor 404 detects that the second lever 442 changes from raised to lowered and the attachment/detachment sensor 406 detects that the case of the hole puncher 42 changes from mounted to removed, the step completion detector 121 determines that the third step is completed, and updates the completion flag 6D23 to "1."

Thereafter, when the second carrying path sensor 405 detects a change from sheet present to sheet absent, the step completion detector 121 determines that the fourth step is completed, and updates the completion flag 6D24 to "1."

When a sheet is not jammed in the hole puncher 42, a change from sheet present to sheet absent is not detected.

When the second carrying path sensor 405 does not detect a change even after a predetermined time (such as 20 seconds) elapses after the previous step or the third step is completed, the step completion detector 121 causes the second carrying path sensor 405 to detect the presence of a sheet. When an answer that no sheet is present is obtained, it is determined that the fourth step is completed, and the completion flag 6D24 is updated to "1."

When an error occurs or the user inputs a predetermined command (such as help command), the guidance screen display unit 122 displays the guidance screen 80 as illustrated in FIG. 18 on the touch panel display 10e.

The guidance screen 80 is configured of a moving image window 81, a progress bar 82, a cursor 83, chapter buttons 84, a reproduction button 85, and an end button 86.

The moving image window 81 displays therein a moving image of guidance to be reproduced (which will be denoted as "target guidance" below).

When an error occurs, the guidance of the maintenance of eliminating the error is selected as target guidance. For example, when an error of a paper jam in the stapler 41 occurs, the guidance of the maintenance of "eliminating a paper jam in the stapler" is selected as target guidance. The selection may be made on the basis of the corresponding error 6AH (see FIG. 5) of the state change data 6A.

Immediately after an error occurs, the guidance screen display unit 122 displays a message for promoting the user to perform the maintenance while watching the target guidance in the moving image window 81.

On the other hand, when the user inputs a predetermined command, the guidance screen display unit 122 displays a list 88 as illustrated in FIG. 19 in the moving image window 81.

The thumbnails are arranged per guidance in the list 88. A thumbnail is a reduced frame at a representative time per step. Thus, the list 88 includes a digest per guidance. When guidance has many representative times, as many thumbnails of frames as a predetermined number of representative times may be arranged. Alternatively, the thumbnails may be scrolled and partially displayed.

Guidance selected by the user from the list 88 is target guidance.

The progress bar 82 indicates a progress of reproduction of the target guidance. The length L of the horizontal width of the progress bar 82 corresponds to the duration of a time required to reproduce the target guidance from the head to the tailing end at a normal speed (at 1× speed) (which will be denoted as "reproduction time T0" below). The left end of the progress bar 82 corresponds to the head of the target guidance and the right end thereof corresponds to the tailing end.

The cursor 83 is arranged on the progress bar 82, and moves depending on a current reproduction time of the target guidance (which will be denoted as "current time Pg" below). Thus, the cursor 83 also indicates a reproduction progress of the target guidance. For example, when the reproduction time T0 is "3 minutes 30 seconds" and the current time Pg is "1 minute 10 seconds," the cursor 83 is arranged at a position L3 rightward from the left end of the progress bar 82.

A chapter button 84 is arranged at the position corresponding to the start time of a chapter on the progress bar 82 per chapter. The chapter buttons 84 except the first chapter button indicate the borders between adjacent chapters.

The progress bar 82 is displayed to be different between the right and left sides of the cursor 83. For example, the left side is displayed in red and the right side is displayed in white. That is, a reproduction progress of the target guidance is indicated by the different forms between the right and left sides. On the other hand, the cursor 83 indicates a reproduction progress of the target guidance depending on a position on the progress bar 82 as described above. The default position of the cursor 83 is at the left end of the progress bar 82.

The user can move the cursor 83 to an arbitrary position on the progress bar 82 by dragging the cursor 83. Alternatively, the user taps a chapter button 84 and can move the cursor 83 to the same position as the chapter button 84. The user operates in this way thereby to jump the target guidance to any time for reproduction.

The reproduction button 85 is a button by which the user instructs to start reproducing target guidance.

The end button 86 is a button by which the user instructs to finish reproducing target guidance.

The first jump destination time determination unit 123 determines to which time in target guidance to jump as follows when a chapter button 84 is tapped and the cursor 83 is dragged. In the following, a jump destination time will be denoted as "jump destination time Ps."

The first jump destination time determination unit 123 moves the cursor 83 as the user drags or taps as ever. That is, when the cursor 83 is dragged, the cursor 83 is moved to the drop position. When a chapter button 84 is tapped, the cursor 83 is moved to the tapped position. The jump destination time Ps is determined at the time corresponding to a position to which the cursor 83 is moved (which will be denoted as "designated position" below), For example, when the reproduction time T0 is "3 minutes 30 seconds" and the designated position is L/6 rightward from the left end of the progress bar 82, the first jump destination time determination unit 123 determines the jump destination time Ps at "0 minute 35 seconds."

When any of the chapter buttons 84 is tapped, the thumbnail display unit 124 displays a thumbnail of a partial image of the moving image of the guidance above the progress bar 82 as follows.

The thumbnail display unit 124 selects a step currently performed by the user (which will be denoted as "current step" below) and its previous step (which will be denoted as "immediately-completed step" below) from among the steps of the maintenance explained by the target guidance (which will be denoted as "maintenance in execution" below). A way to specify is as follows.

The thumbnail display unit 124 searches steps with the completion flag 6D of "O" and steps with the completion flag 6D of "1" from among the steps of the maintenance in execution. The earliest step among the steps with "0" is selected as current step. The last step among the steps with "1" is selected as immediately-completed step.

Further, the thumbnail display unit 124 selects a step immediately after the current step as "next step."

The thumbnail display unit 124 displays the thumbnail 87a of a frame at a representative time of the current step, the thumbnail 87b of a frame at a representative time of the immediately-completed step, and the thumbnail 87c of a frame at a representative time of the next step above the progress bar 82 as illustrated in FIG. 20. The thumbnail 87b is attached with a mark 89 indicating that the corresponding step has been already completed. In the example of FIG. 20, the lower end is attached with a belt as mark. The representative times of the current step and the immediately-completed step are indicated in the step data, respectively. A star-shaped image may be attached instead of a belt. Alternatively, a character string such as "DONE!" may be attached. A representative time of each step is indicated in the step data of the step.

The thumbnail 87a is desirably arranged above a part corresponding to the current step in the progress bar 82. Similarly, it is desirable that the thumbnail 87b is arranged above a part corresponding to the immediately-completed step and the thumbnail 87c is arranged above a part corresponding to the next step.

When the current step is the last step of the maintenance in execution, the next step is not present and thus the thumbnail 87c is not displayed. When the current step is the first step in the maintenance in execution, the immediately-completed step is not present and thus the thumbnail 87b is not displayed.

The second jump destination time determination unit 125 determines the jump destination time Ps as follows when any of the thumbnails 87a, 87b, and 87c is tapped.

When the thumbnail 87a is tapped, the second jump destination time determination unit 125 determines the jump destination time Ps at the head (start) time of the current step. When the thumbnail 87b is tapped, the jump destination time Ps is determined at the head time of the immediately-completed step. When the thumbnail 87c is tapped, the jump destination time Ps is determined at the head time of the next step.

The moving image reproduction unit 126 displays a moving image of target guidance in the moving image window 81 on the guidance screen 80 on the basis of the guidance data 6B of the target guidance. That is, the moving image reproduction unit 126 reproduces a moving image of target guidance.

Specifically, the moving image reproduction unit 126 reproduces a moving image as follows depending on a user operation, a processing result of the first jump destination time determination unit 123, or a processing result of the second jump destination time determination unit 125.

When the user taps the reproduction button 85, the moving image reproduction unit 126 reads the guidance data 6B of target guidance from the reproduction data storage unit 102, and starts reproducing the target guidance at a time corresponding to a current position of the cursor 83. If the user has not operated the progress bar 82, the cursor 83, or a chapter button 84 yet, the default position of the cursor 83 is at the left end of the progress bar 82, and thus the target guidance starts being reproduced at the head of the first step or "0 minute 0 second."

When the user operates the progress bar 82, the cursor 83, or a chapter button 84 during reproduction, the jump destination time Ps is determined by the first jump destination time determination unit 123 or the second jump destination time determination unit 125 as described above. The moving image reproduction unit 126 then jumps to the jump destination time Ps and continues to reproduce the moving image.

For example, when the jump destination time Ps is determined at "3 minutes 25 seconds" while the moving image at the time of "3 minutes 5 seconds" is being reproduced, the moving image reproduction unit 126 skips to "3 minutes 25 seconds" and reproduces the moving image. Alternatively, when the jump destination time Ps is determined at "2 minutes 15 seconds," the moving image reproduction unit 126 returns to "2 minutes 15 seconds" and reproduces the moving image.

The speech reproduction unit 127 controls the speech unit 10k such that speech is output according to the moving image displayed by the moving image reproduction unit 126 on the basis of the guidance data 6B of the target guidance.

Figure 21:
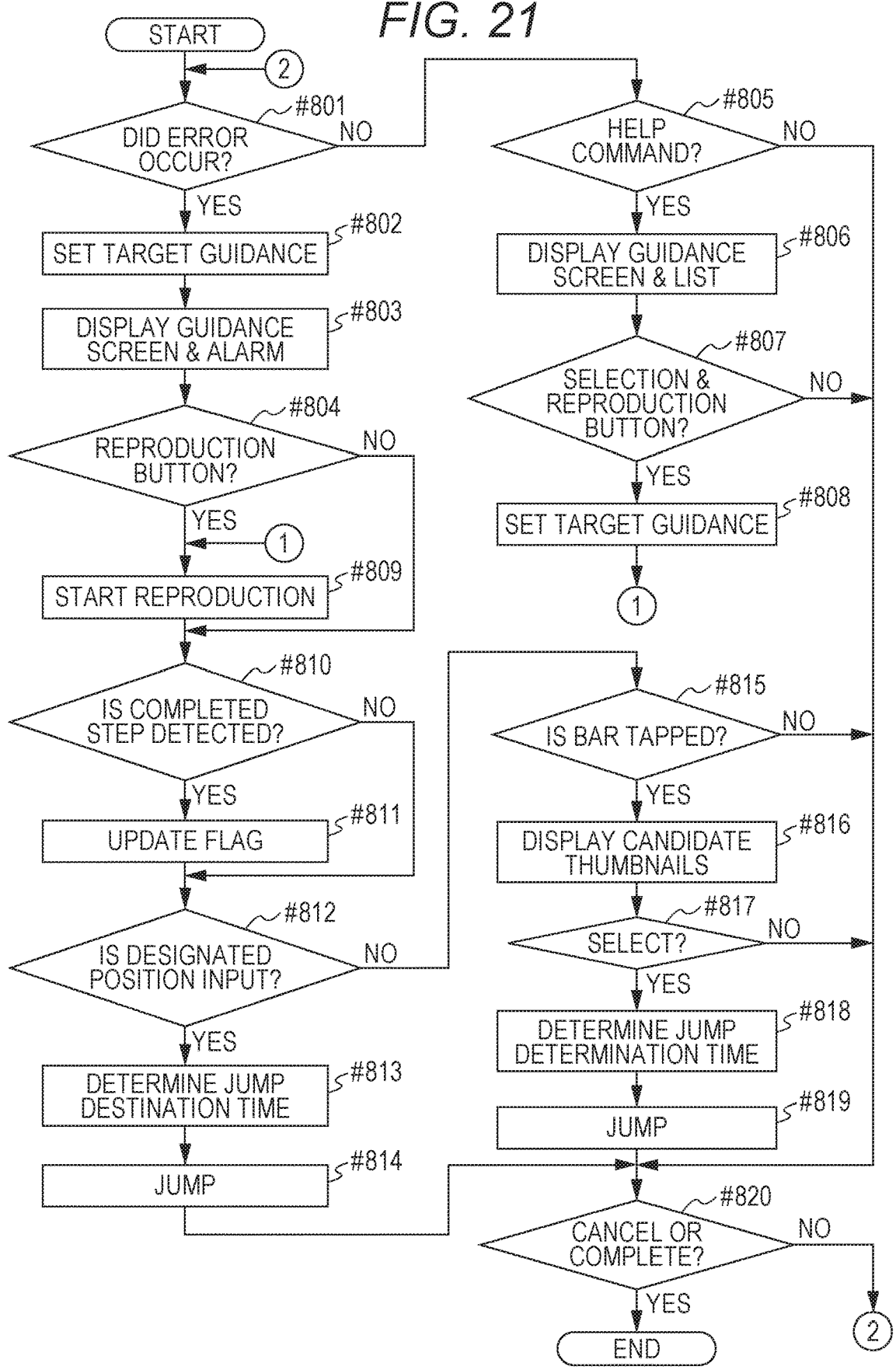
FIG. 21 is a flowchart for explaining an exemplary total flow of a series of processing of an image formation apparatus.

FIG. 21 is a flowchart for explaining an exemplary total flow of the series of processing of the image formation apparatus 1.

A total flow of the series of processing of the image formation apparatus 1 will be described below with reference to the flowchart of FIG. 21.

The image formation apparatus 1 performs the series of processing in the procedure illustrated in FIG. 21 on the basis of the guidance reproduction program 10P.

When an error occurs (Yes in #801 in FIG. 21), the image formation apparatus 1 sets the guidance corresponding to the maintenance for eliminating the error as target guidance (#802), and displays the guidance screen 80 (#803). At this time, a message for promoting the user to perform the maintenance while watching the target guidance is arranged in the moving image window 81 as illustrated in FIG. 18. When the user taps the reproduction button 85 (Yes in #804), the target guidance starts being reproduced at a time corresponding to a current position of the cursor 83 (#809).

Alternatively, when a predetermined command (such as help command) is input (No in #801, Yes in #805), the image formation apparatus 1 displays the guidance screen 80 (#806). At this time, the list 88 is arranged in the moving image window 81 as illustrated in FIG. 19. When the user selects any guidance and taps the reproduction button 85 (Yes in #807), the selected guidance is set as target guidance (#808), and the target guidance starts being reproduced at a time corresponding to a current position of the cursor 83 (#809).

When detecting a completed step (Yes in #810), the image formation apparatus 1 updates the completion flag 6D of the step (see FIGS. 17A and 17B) to "1" (#811).

Alternatively, when the user drags the cursor 83 or taps a chapter button 84 to input a designated position (Yes in #812), the image formation apparatus 1 determines the jump destination time Ps on the basis of the designated position (#813), and jumps to the jump destination time Ps (#814). When the target guidance has already started being reproduced, the target guidance starts being reproduced at the jump destination time Ps.

Alternatively, when the user taps the progress bar 82 (Yes in #815), the image formation apparatus 1 displays the thumbnails 87a, 87b, and 87c as illustrated in FIG. 20 (#816). However, when the current step is the first step, the thumbnail 87b is not displayed, and when the current step is the last step, the thumbnail 87c is not displayed. Further, the thumbnail 87b is attached with the mark 89.

When the user taps any of the thumbnails 87a, 87b, and 87c (Yes in #817), the image formation apparatus 1 determines the jump destination time Ps at the head time of the step corresponding to the tapped thumbnail (#818). The image formation apparatus 1 then jumps to the jump destination time Ps (#819). When the target guidance has already started being reproduced, the target guidance starts being reproduced at the jump destination time Ps.

Until the target guidance reaches the tailing end or the user taps the end button 86, the image formation apparatus 1 performs the processing in step #809, the processing in step #811, the series of processing in steps #813 to #814, the processing in step #816, and the series of processing in steps #818 to #819 as needed.

According to the present embodiment, the user can more easily select a time to reproduce a moving image by the progress bar 82 than ever.

Figure 22:
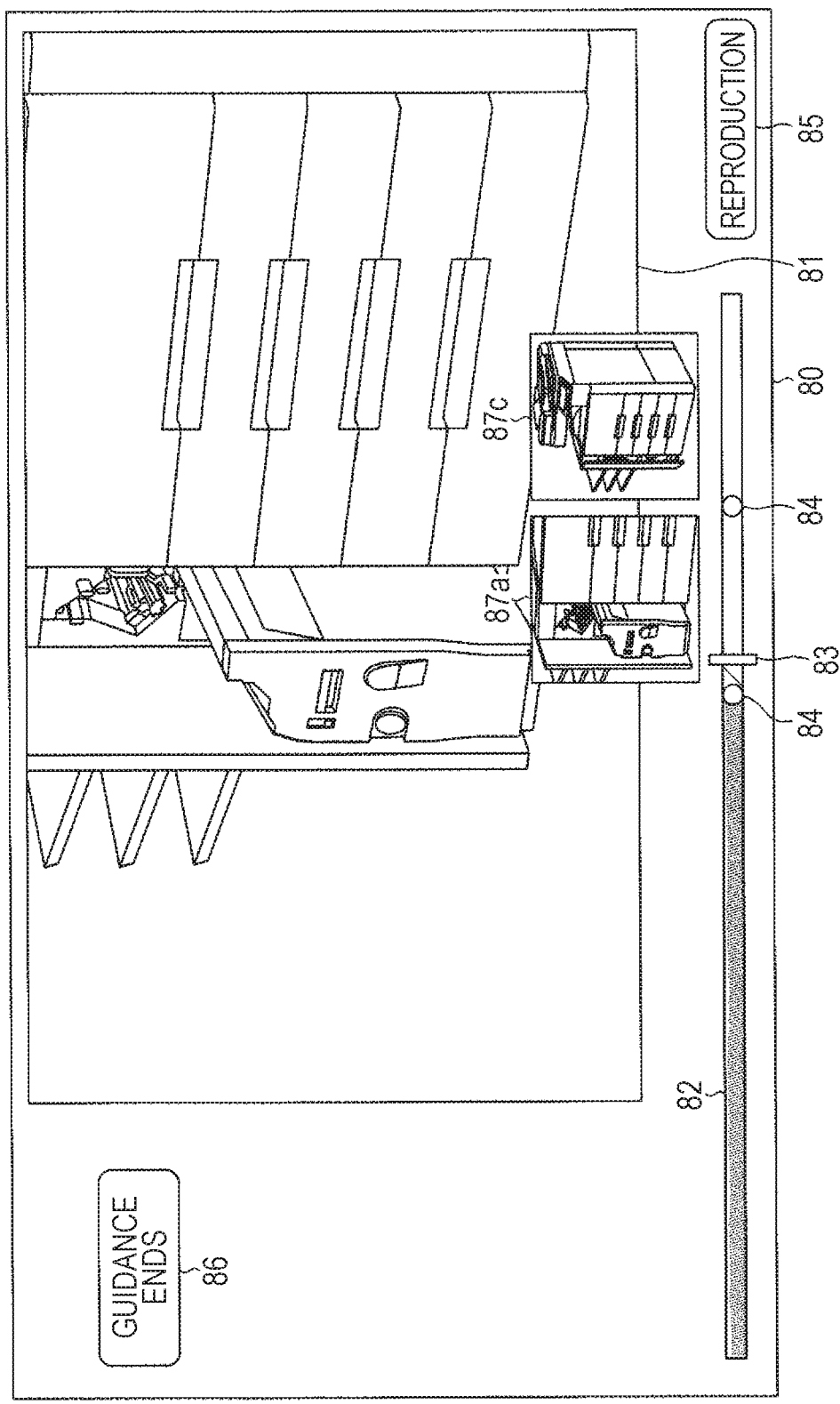
FIG. 22 is a diagram illustrating a variant of a display form of a progress bar and
FIG. 23 is a diagram illustrating a variant of a display form of the thumbnails.
Figure 23:
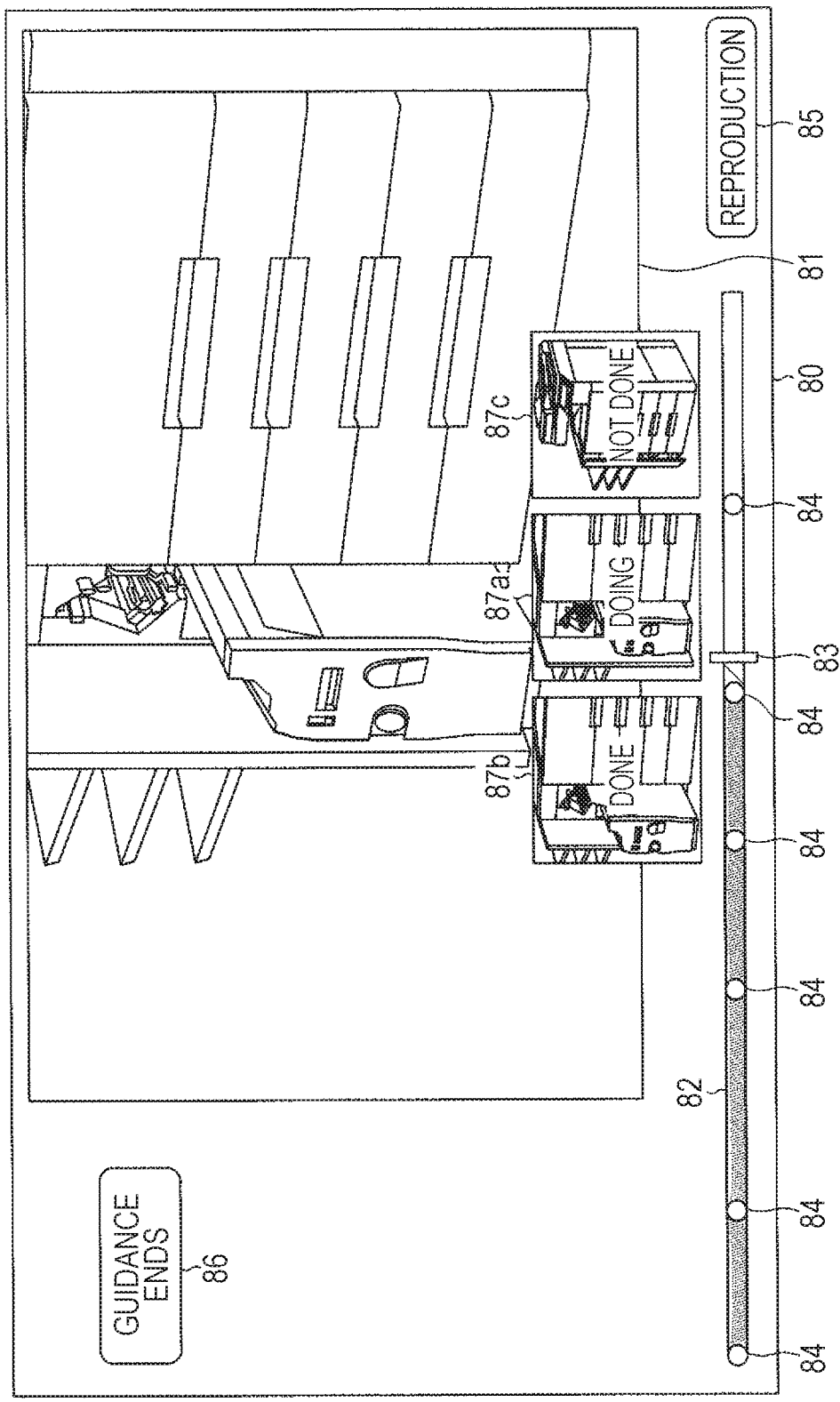

FIG. 22 is a diagram illustrating a variant of a display form of the progress bar 82. FIG. 23 is a diagram illustrating a variant of a display form of the thumbnails 87a to 87c.

One step is provided with one representative time according to the present embodiment, but may be provided with a plurality of representative times. In this case, if the current step has a plurality of representative times when the progress bar 82 is tapped, the thumbnail display unit 124 may display the thumbnails of the frames at the respective representative times as thumbnails 87a. Similarly, if the immediately-completed step has a plurality of representative times, the thumbnails of the frames at the respective representative times may be displayed as thumbnails 87b, and if the next step has a plurality of representative times, the thumbnails of the frames at the respective representative times may be displayed as thumbnails 87c.

The thumbnail display unit 124 displays the thumbnails 87a, 87b, and 87c when the progress bar 82 is tapped according to the present embodiment, but may display the same when the progress bar 82 is long tapped or doubled tapped. When the progress bar 82 is tapped, the first jump destination time determination unit 123 may determine the jump destination time Ps at a time corresponding to the tapped position as ever. Alternatively, the thumbnail of the frame at the time may be displayed.

According to the present embodiment, the thumbnail display unit 124 displays the thumbnail 87a or the thumbnail of the frame at the representative time of the current step as the thumbnail for jumping to the current step. However, the thumbnail of the frame at the representative time of the immediately-completed step may be instead displayed. With the display, the user can jump the target guidance to the current step or the step currently in execution by selecting the thumbnail of the last step among his/her completed steps.

The thumbnail display unit 124 displays three thumbnails 87a, 87b, and 87c as thumbnails for jump according to the present embodiment, but may not display the thumbnail 87b. That is, the thumbnail for jumping to the completed step may not be displayed. Alternatively, the thumbnail of the immediately-completed step may be displayed in grayout, and the thumbnails of the current step and the next step may be highlighted.

The guidance screen display unit 122 displays the chapter buttons 84 in the respective steps in the same form according to the present embodiment, but may discriminate the chapter buttons 84 of the completed steps and the other chapter buttons 84 for display. For example, the former may be displayed in grayout and the latter may be displayed in white in a black frame. Further, the former may not be displayed. Alternatively, the completed steps in the progress bar 82 may be in grayout as in FIG. 22.

The thumbnail display unit 124 attaches the mark 89 to the thumbnail 87b according to the present embodiment, but may attach different marks to the thumbnails 87a, 87b, and 87c, respectively. For example, as illustrated in FIG. 23, the thumbnail 87a, the thumbnail 87b, and the thumbnail 87c may be attached with a character string of "doing," a character string of "done," and a character string of "not done," respectively.

The thumbnail display unit 124 displays the respective thumbnails of the current step, the immediately-competed step, and the next step as thumbnails for jump according to the present embodiment, but may display the thumbnails of the other steps as follows, for example.

Importance data indicating an importance of each step in a maintenance is stored in a predetermined storage area (such as the reproduction data storage unit 102) per maintenance. For example, the data "5, 2, 1, 4, 3" is stored as importance data of the maintenance of "eliminating a paper jam in the fixing unit." This means that the importance of the first to fifth steps in the maintenance is "5," "2," "1," "4," and "3," respectively. The importance is higher in order of "1," "2," . . . .

When the progress bar 82 is tapped, the thumbnail display unit 124 selects a predetermined number of steps from the steps except the completed steps in descending order of importance. The thumbnails of the frames at the representative times of the respective selected steps are displayed.

By way of the exemplary importance data, when only the first step is completed and the predetermined number is "3," the thumbnail display unit 124 selects the second, third, and fifth steps and displays the thumbnails thereof.

A time required to complete each step in a maintenance (required time) is measured per maintenance and the required time data indicating the required time is stored in a predetermined storage area. For example, the times required to complete the respective steps in the maintenance of "eliminating a paper jam in the fixing unit" are "1 minute 20 seconds," "40 seconds," "1 minute 30 seconds," "35 seconds," and "20 seconds," respectively, the data of "1 minutes 20 seconds, 35 seconds, 1 minute 30 seconds, 35 seconds, 20 seconds" is stored as required time data.

When the guidance of the maintenance is target guidance, the thumbnail display unit 124 selects a predetermined number of steps from among the steps except the completed steps in descending order of required time when the progress bar 82 is tapped. The thumbnails of the frames at the representative times of the respective selected steps are displayed. Alternatively, a predetermined number of steps with a high rate of the required time relative to the reproduction time of the chapter of each step may be selected. For example, in the case of the maintenance guidance, the reproduction times of the chapters of the respective steps are "1 minute 30 seconds," "45 seconds", "1 minute 5 seconds," "25 seconds," and "35 seconds," respectively. The rates of the steps are almost "0.89," "0.78," "1.38," "1.4," and "0.57," respectively. Thus, the fourth step, the third step, the first step, the second step, and the fifth steps are preferentially selected in this order, and the thumbnails thereof are displayed.

Alternatively, the number of failures may be recorded instead of the required time. When the progress bar 82 is tapped, the thumbnail display unit 124 selects a predetermined number of steps from among the steps except the completed steps in descending order of the number of failures. The thumbnails of the frames at the representative times of the respective selected steps are then displayed. Failure or success can be known by checking whether the state of the state change data 6A (see FIG. 5) changes as the change corresponding to the current step.

A step which takes a longer time than the predetermined time (twice the reproduction time of a corresponding chapter) may be counted as one failure.

The guidance data 6B is stored in the reproduction data storage unit 102 according to the present embodiment, but may be stored in a server (file server or cloud server) accessible by the image formation apparatus 1. Each unit in the image formation apparatus 1 may access the server and download the guidance data 6B as needed.

When target guidance finishes being reproduced, the thumbnail display unit 124 may display the thumbnails of the fames at the representative times of the failed steps or not-completed steps.

Guidance is reproduced by the image formation apparatus 1 according to the present embodiment, but may be reproduced by a terminal device such as Smartphone or tablet computer capable of making communication with the image formation apparatus 1.

In this case, the terminal device may download the data stored in the state change data storage unit 101, the reproduction data storage unit 102, or the progress data storage unit 103 from the image formation apparatus 1. A sensor detection result may be received from the image formation apparatus 1. The terminal device may be provided with the functions corresponding to the step completion detector 121, the guidance screen display unit 122, the first jump destination time determination unit 123, the thumbnail display unit 124, the second jump destination time determination unit 125, the moving image reproduction unit 126, and the speech reproduction unit 127. Further, a touch panel display and a speech unit provided in the terminal device may be used instead of the touch panel display 10e and the speech output unit 10k.

The present embodiment has been described by way of guidance of a maintenance of eliminating a paper jam (jam), but an embodiment of the present invention is applicable to guidance of a maintenance of exchanging consumables or resupplying sheets.

The thumbnail display unit 124 displays a thumbnail of a representative frame of a step as an image indicating a candidate jump destination according to the present embodiment, but may display the title or number of a step.

Additionally, the configurations of the entire image formation apparatus 1 or the respective units, the processing contents, the processing order, the data configuration, and the screen configuration can be changed as needed according to the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A candidate display method in a moving image reproduction apparatus for reproducing a moving image for explaining a work including a plurality of steps, the moving image reproduction apparatus having a display device including a display screen, the method comprising:
    reproducing the moving image on the display screen of the display device;
    displaying, on the display screen of the display device, an indicator indicating a progress of reproduction of the moving image and a position on the indicator where the moving image is being currently reproduced, wherein the indicator comprises a progress bar whose length represents a time duration of the moving image;
    determining a current step that is being performed from among the plurality of steps of the work based on a detection result of a sensor that is provided in a body of an electronic apparatus on which the work is being performed, wherein the sensor detects a physical state change in the body of the electronic apparatus and outputs, as the detection result, a detection result indicating the detected physical state change in the body of the electronic apparatus, wherein the current step that is being performed is determined based on the detected physical state change indicated by the detection result output by the sensor; and
    when a user performs a predetermined operation on the progress bar, displaying, on the display screen of the display device, (i) a first candidate image corresponding to a first jump destination included in the moving image, and (ii) a second candidate image corresponding to a second jump destination included in the moving image, wherein the first candidate image is a frame image at a representative time in the moving image of the determined current step being performed in the electronic apparatus, and the second candidate image is a frame image at a representative time in the moving image of another step among the plurality of steps that precedes or follows the determined current step being performed in the electronic apparatus, in the moving image,
    wherein the first jump destination corresponds to a time point in the moving image of the determined current step,
    wherein the second jump destination corresponds a time point in the moving image of said another step that precedes or follows the determined current step, in the moving image,
    wherein the first candidate image is displayed at a position along the length of the progress bar that corresponds to the determined current step, and the second candidate image is displayed at a position along the length of the progress bar that corresponds to said another step,
    wherein the first candidate image and the second candidate image are displayed simultaneously at their respective corresponding positions along the length of the progress bar, and
    wherein the method further comprises:
    detecting another operation by the user specifying one of the displayed first candidate image and the displayed second candidate image;
    in a case in which the first candidate image is specified by said another operation, reproducing the moving image from the time point of the first jump destination; and
    in a case in which the second candidate image is specified by said another operation, reproducing the moving image from the time point of the second jump destination.

2. A moving image reproduction apparatus for reproducing a moving image for explaining a work including a plurality of steps, the apparatus comprising:
    a display device including a display screen; and
    a hardware processor which is configured to:
    reproduce the moving image on the display screen;
    control the display device to display, on the display screen, an indicator indicating a progress of reproduction of the moving image and a position on the indicator where the moving image is being currently reproduced, wherein the indicator comprises a progress bar whose length represents a time duration of the moving image;
    determine a current step that is being performed from among the plurality of steps of the work based on a detection result of a sensor that is provided in a body of an electronic apparatus on which the work is being performed, wherein the sensor detects a physical state change in the body of the electronic apparatus and outputs, as the detection result, a detection result indicating the detected physical state change in the body of the electronic apparatus, wherein the current step that is being performed is determined based on the detected physical state change indicated by the detection result output by the sensor; and
    when a user performs a predetermined operation on the progress bar, control the display device to display, on the display screen, (i) a first candidate image corresponding to a first jump destination included in the moving image, and (ii) a second candidate image corresponding to a second jump destination included in the moving image, wherein the first candidate image is a frame image at a representative time in the moving image of the determined current step being performed in the electronic apparatus, and the second candidate image is a frame image at a representative time in the moving image of another step among the plurality of steps that precedes or follows the determined current step being performed in the electronic apparatus, in the moving image, wherein the first jump destination corresponds to a time point in the moving image of the determined current step, wherein the second jump destination corresponds a time point in the moving image of said another step that precedes or follows the determined current step, in the moving image, wherein the first candidate image is displayed at a position along the length of the progress bar that corresponds to the determined current step, and the second candidate image is displayed at a position along the length of the progress bar that corresponds to said another step, wherein the first candidate image and the second candidate image are displayed simultaneously at their respective corresponding positions along the length of the progress bar, and wherein the hardware processor is further configured to:

detect another operation by the user specifying one of the displayed first candidate image and the displayed second candidate image;

in a case in which the first candidate image is specified by said another operation, reproduce the moving image from the time point of the first jump destination; and in a case in which the second candidate image is specified by said another operation, reproduce the moving image from the time point of the second jump destination.

3. The moving image reproduction apparatus according to claim 2, wherein the hardware processor is configured to control the display device to display, as the first candidate image, a thumbnail of the frame image at the representative time in the moving image of the determined current step, and to display, as the second candidate image, a thumbnail of the frame image at the representative time in the moving image of said another step.

4. The moving image reproduction apparatus according to claim 3, wherein the time point of the first jump destination is a head of the determined current step corresponding to the first jump destination, and the time point of the second jump destination is a head of said another step corresponding to the second jump destination.

5. The moving image reproduction apparatus according to claim 2, wherein the hardware processor is configured to control the display device to display, as the first candidate image, an image indicating a first step immediately after a last-completed step among the steps, the first step being determined as the current step.

6. The moving image reproduction apparatus according to claim 5, wherein the hardware processor is configured to control the display device to display, as the second candidate image, an image indicating a second step immediately after the first step among the steps.

7. The moving image reproduction apparatus according to claim 5, wherein the hardware processor is configured to control the display device to display, as the second candidate image, an image indicating a third step immediately before the first step among the steps.

8. The moving image reproduction apparatus according to claim 7, wherein the hardware processor is configured to control the display device to display the second candidate image corresponding to the third step in a different form from the first candidate image.

9. The moving image reproduction apparatus according to claim 2, wherein the hardware processor is configured to control the display device to display completed steps among the steps in a different form from incomplete steps among the steps.

10. The moving image reproduction apparatus according to claim 2, wherein:

the electronic apparatus is an image formation apparatus, the work is for the image formation apparatus, and the work is any of a maintenance of eliminating a paper jam occurring in the image formation apparatus, a maintenance of exchanging consumables, and a maintenance of resupplying sheets.

11. The moving image reproduction apparatus according to claim 2, wherein the hardware processor is further configured to specify a completed step among the steps, and wherein the hardware processor is configured to control the display device to display the first candidate image and the second candidate image based on the specified completed step.

12. A non-transitory recording medium storing a computer readable program used in a computer for reproducing a moving image for explaining a work including a plurality of steps, the program causing the computer to perform functions comprising:

reproducing the moving image on a display screen of a display device;

displaying, on the display screen of the display device, an indicator indicating a progress of reproduction of the moving image and a position on the indicator where the moving image is being currently reproduced, wherein the indicator comprises a progress bar whose length represents a time duration of the moving image;

determining a current step that is being performed from among the plurality of steps of the work based on a detection result of a sensor that is provided in a body of an electronic apparatus on which the work is being performed, wherein the sensor detects a physical state change in the body of the electronic apparatus and outputs, as the detection result, a detection result indicating the detected physical state change in the body of the electronic apparatus, wherein the current step that is being performed is determined based on the detected physical state change indicated by the detection result output by the sensor; and when a user performs a predetermined operation on the progress bar, displaying, on the display screen of the display device, (i) a first candidate image corresponding to a first jump destination included in the moving image, and (ii) a second candidate image corresponding to a second jump destination included in the moving image, wherein the first candidate image is a frame image at a representative time in the moving image of the determined current step being performed in the electronic apparatus, and the second candidate image is a frame image at a representative time in the moving image of another step among the plurality of steps that precedes or follows the determined current step being performed in the electronic apparatus, in the moving image, wherein the first jump destination corresponds to a time point in the moving image of the determined current step, wherein the second jump destination corresponds a time point in the moving image of said another step that precedes or follows the determined current step, in the moving image, wherein the first candidate image is displayed at a position along the length of the progress bar that corresponds to the determined current step, and the second candidate image is displayed at a position along the length of the progress bar that corresponds to said another step, wherein the first candidate image and the second candidate image are displayed simultaneously at their respective corresponding positions along the length of the progress bar, and wherein the program causes the computer to perform further functions comprising:

detecting another operation by the user specifying one of the displayed first candidate image and the displayed second candidate image;

in a case in which the first candidate image is specified by said another operation, reproducing the moving image from the time point of the first jump destination; and in a case in which the second candidate image is specified by said another operation, reproducing the moving image from the time point of the second jump destination.

* * * * *